US008819360B2

(12) United States Patent
Ito

(10) Patent No.: US 8,819,360 B2
(45) Date of Patent: Aug. 26, 2014

(54) INFORMATION PROCESSING APPARATUS, CACHE APPARATUS, AND DATA PROCESSING METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 13/173,970

(22) Filed: Jun. 30, 2011

(65) Prior Publication Data
US 2012/0030453 A1 Feb. 2, 2012

(30) Foreign Application Priority Data

Aug. 2, 2010 (JP) ................................. 2010-173961

(51) Int. Cl.
*G06F 13/00* (2006.01)
*G06F 13/28* (2006.01)

(52) U.S. Cl.
USPC .................... 711/158; 711/140; 711/E12.075

(58) Field of Classification Search
None
See application file for complete search history.

(56) References Cited

U.S. PATENT DOCUMENTS

| 5,572,690 | A | 11/1996 | Molnar et al. |
| 6,247,115 | B1 * | 6/2001 | Janik et al. ..................... 712/219 |
| 6,845,379 | B2 | 1/2005 | Ito et al. |
| 2010/0299498 | A1 | 11/2010 | Ito |

FOREIGN PATENT DOCUMENTS

| JP | 04-184533 A | 7/1992 |
| JP | 3588487 B | 11/2004 |

OTHER PUBLICATIONS

U.S. Appl. No. 13/105,062, filed May 11, 2011.

* cited by examiner

*Primary Examiner* — Eric S Cardwell
(74) *Attorney, Agent, or Firm* — Fitzpatrick, Cella, Harper & Scinto

(57) ABSTRACT

A more efficient technique is provided in an information processing apparatus which executes processing using pipelines. An information processing apparatus according to this invention includes a first pipeline, second pipeline, processing unit, and reorder unit. The first pipeline has a plurality of first nodes, and shifts first data held in a first node to a first node. The second pipeline has a plurality of second nodes respectively corresponding to the first nodes of the first pipeline, and shifts second data held in a second node to a second node. The processing unit executes data processing using the first data and the second data. The reorder unit holds one of the output second data based on attribute information of the second data output from the second pipeline, and outputs the held second data to the second pipeline.

15 Claims, 15 Drawing Sheets

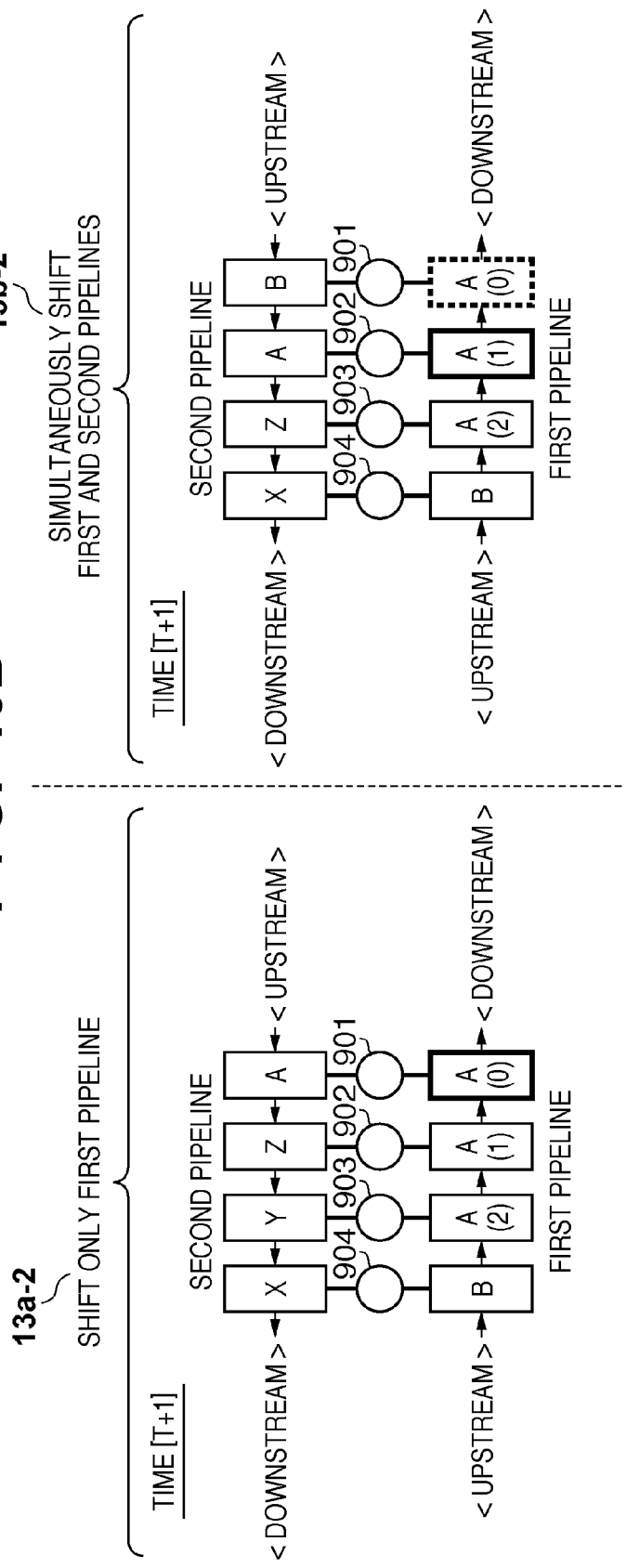

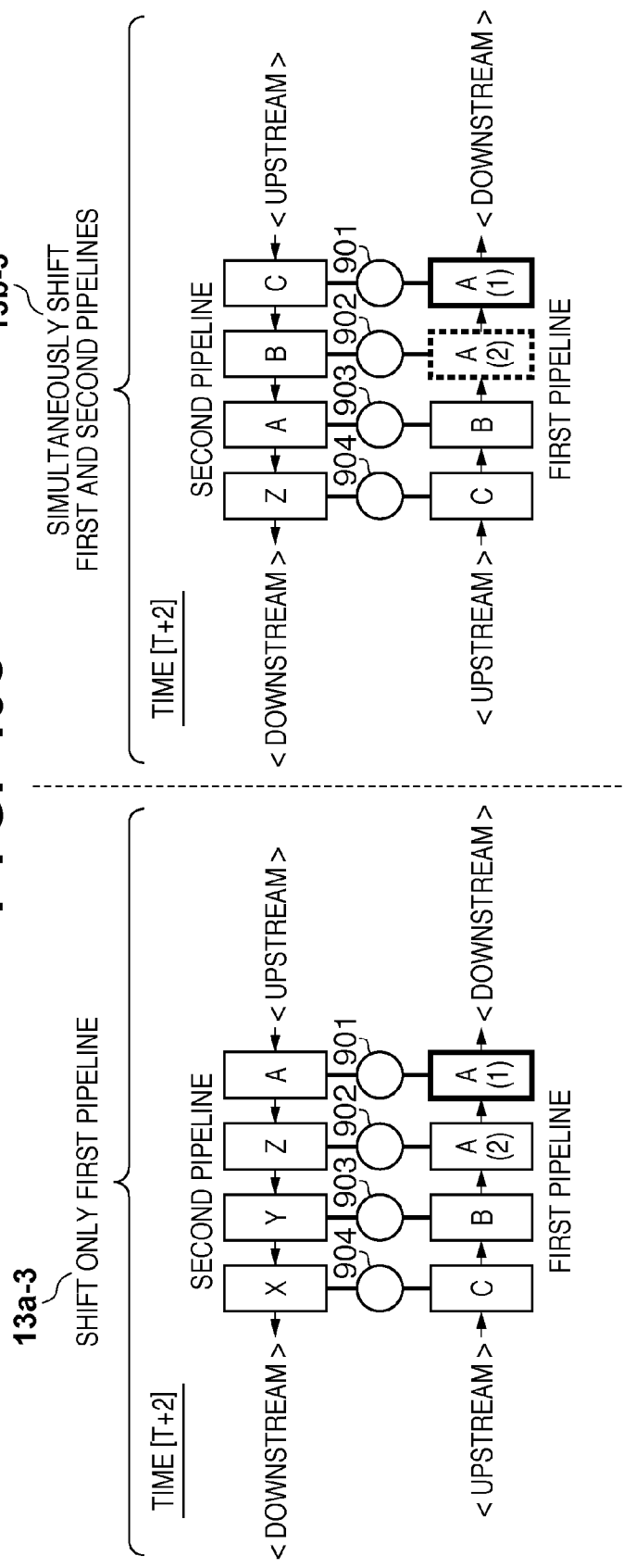

INFORMATION PROCESSING APPARATUS, CACHE APPARATUS, AND DATA PROCESSING METHOD

BACKGROUND OF THE INVENTION

1. Field of the Invention

The present invention relates to an information processing technique for processing data elements in nodes connected to each other between two data streams each having a plurality of nodes.

2. Description of the Related Art

An application which compares data elements held by nodes in two data streams each having a plurality of nodes is available. For example, processing which makes comparisons by a round-robin method when it is determined whether or not elements of a first data stream having a plurality of data match at least one of elements of a second data stream is known. Such application compares data elements in the first data stream which shifts data elements in a given direction, and the second data stream which shifts data elements in a direction opposite to the given direction. However, as will be described later, a case in which comparisons of data elements in respective nodes may often not normally work in the two data streams which shift data elements in opposite directions occurs.

Japanese Patent No. 3588487 (patent literature 1) describes a two-way pipeline technique (counterflow pipeline technique) which compares respective data elements in respective stages of pipelines in pipeline data streams of two different types, which shift data elements in opposite directions. This patent literature 1 discloses one solution to the case in which comparisons of data elements in respective nodes do not normally work.

The case in which comparisons of data elements do not normally work in this application will be described below with reference to FIGS. 13A to 13C. FIGS. 13A to 13C partially show two pipeline circuits which shift data elements in opposite directions. A first pipeline on the lower side shifts data elements from the left side on the plane of the drawing as "upstream" toward the right side on the plane of the drawing as "downstream". On the other hand, a second pipeline on the upper side shifts data elements from the right side on the plane of the drawing as "upstream" toward the left side on the plane of the drawing as "downstream".

13a-1 to 13a-3 of FIGS. 13A to 13C show a case in which comparisons of data elements are normally done, and the aforementioned problem is not posed. In this case, the first pipeline operates to shift data elements, and the second pipeline stops not to shift data elements. 13a-1 of FIG. 13A shows a state at time [T], 13a-2 of FIG. 13B shows a state at time [T+1] after an elapse of a predetermined time period from time [T], and 13a-3 of FIG. 13C shows a state at time [T+2] after a further elapse of a predetermined time period from time [T+1].

Now assume that the first pipeline operates to shift data elements W, A(0), A(1), A(2), B, and C held in pipeline stages from the left side on the plane of the drawing as "upstream" toward the right side on the plane of the drawing as "downstream". Note that the data elements A(0), A(1), and A(2) are described by attaching (0), (1), and (2) to A to distinguish them from each other for the sake of descriptive convenience, but they can be considered as those equivalent to other data. Corresponding stages of the first and second pipelines are connected to each other via determination stages 901 to 904 each of which determines whether or not two data elements are the same by comparison.

At time [T] in 13a-1 of FIG. 13A, the determination results of the respective stages are as follows in turn from "downstream" of the first pipeline. The determination stage 901 on the most downstream side of the first pipeline compares data elements W and A. In this case, since the two data elements do not match, the stage 901 determines <false>. The subsequent determination stages 902 to 904 respectively compare data elements A(0) and Z, data elements A(1) and Y, and data elements A(2) and X. Since these data elements do not match, these stages determine <false>.

At time [T+1] of 13a-2 of FIG. 13B after an elapse of a time period, the data elements in the first pipeline shift by one stage to "downstream". The determination results in the determination stages 901 to 904 are as follows in turn from "downstream" of the first pipeline. The determination stage 901 compares data elements A(0) and A. Since these two data elements match, the stage 901 determines <true>. The subsequent determination stages 902 to 904 respectively compare data elements A(1) and Z, data elements A(2) and Y, and data element B and X. Since these data elements do not match, these stages determine <false>.

At time [T+2] of 13a-3 of FIG. 13C after a further elapse of a time period, the data elements in the first pipeline further shift by one stage to "downstream". The determination results in the determination stages 901 to 904 are as follows in turn from "downstream" of the first pipeline. The determination stage 901 compares data elements A(1) and A. Since these two data elements match, the stage 901 determines <true>. The subsequent determination stages 902 to 904 respectively compare data elements A(2) and Z, data elements B and Y, and data element C and X. Since these data elements do not match, these stages determine <false>.

As described above, the data elements in the first pipeline shift around the stages as elapses of time periods. The data element A located on "upstream" of the second pipeline can be normally compared with the data elements A(0) and A(1) in the first pipeline. In this way, when one of the first and second pipeline operates, and the other stops, comparisons of the data elements are normally done.

13b-1 to 13b-3 of FIGS. 13A to 13C show a case in which both the first and second pipelines operate. 13b-1 to 13b-3 of FIGS. 13A to 13C show states at the same times as 13a-1 to 13a-3 of FIGS. 13A to 13C. Since the operations of the first pipeline are the same as those in 13a-1 to 13a-3 of FIGS. 13A to 13C, a description thereof will not be repeated. On the other hand, the operations of the second pipeline are different from those in 13a-1 to 13a-3 of FIGS. 13A to 13C. That is, the second pipeline shifts data elements X, Y, Z, A, B, and C held in pipeline stages from the right side on the plane of the drawing as "upstream" toward the left side on the plane of the drawing as "downstream". The determination results of the determination stages in the corresponding stages of the first and second pipelines will be explained below in the same manner as in 13a-1 to 13a-3 of FIGS. 13A to 13C.

At time [T] of 13b-1 of FIG. 13A, the determination results of the respective stages are as follows in turn from "downstream" of the first pipeline. The determination stage 901 on the most downstream side of the first pipeline compares data elements W and A. In this case, since the two data elements do not match, the stage 901 determines <false>. The subsequent determination stages 902 to 904 respectively compare data elements A(0) and Z, data elements A(1) and Y, and data elements A(2) and X. Since these data elements do not match, these stages determine <false>.

At time [T+1] of 13b-2 of FIG. 13B after an elapse of a time period, the data elements in the first and second pipelines shift by one stage to their downstream sides. The determination results in the determination stages 901 to 904 are as follows in turn from "downstream" of the first pipeline. The determination stage 901 compares data elements A(0) and B. Since these two data elements do not match, the stage 901 determines <false>. The next determination stage 902 compares data elements A(1) and A. Since these two data elements match, the stage 902 determines <true>. The subsequent determination stages 903 and 904 respectively compare data elements A(2) and Z and data element B and Y. Since these data elements do not match, these stages determine <false>.

At time [T+2] of 13b-2 of FIG. 13B after a further elapse of a time period, the data elements in the first and second pipelines shift by one stage to their "downstream" sides. The determination results in the determination stages 901 to 904 are as follows in turn from "downstream" of the first pipeline. The determination stage 901 compares data elements A(1) and C. Since these two data elements do not match, the stage 901 determines <false> (however, A(1) has already been determined as <true> in the determination stage 902 in 13b-2 in FIG. 13B). The subsequent determination stages 902 to 904 respectively compare data elements A(2) and B, data elements B and A, and data element C and Z. Since these data elements do not match, these stages determine <false>.

As described above, when the first and second pipelines move at the same time, the data element A located on "upstream" of the second pipeline is compared with the data element A(1) of the first pipeline. However, the data elements A(0) and A(2) are never compared with the data element A of the second pipeline. For example, as can be seen from the above description, when the respective data elements of the first pipeline match at least one of the respective data elements of the second pipeline, the processes in 13b-1 to 13b-3 of FIGS. 13A to 13C cannot attain normal determination. This is because since both the first and second pipelines move in the opposite directions, the relative moving speed of the two pipelines doubles.

In practice, in the case of 13a-1 to 13a-3 of FIGS. 13A to 13C, only the comparisons of the data elements W, A(0), and A(1) of the first pipeline are completed during an interval between times [T] to [T+2]. By contrast, in the case of 13b-1 to 13b-3 of FIGS. 13A to 13C, the comparisons of the data elements W, A(0), A(1), A(2), and B of the first pipeline are completed. In this manner, the case of 13b-1 to 13b-3 of FIGS. 13A to 13C can shorten a determination time period compared to the case of 13a-1 to 13a-3 of FIGS. 13A to 13C, but it causes comparison errors of data elements.

The technique of Japanese Patent No. 3588487 solves this problem by shifting data elements in an irregular schedule according to an execution-scheduled operation with respect to a specific stage through which data elements pass when they shift, and data elements. More specifically, the stage statuses of the respective stages of the first and second pipelines are monitored. Then, in a specific stage which poses this problem, shifting of data elements in the pipelines in the two directions is stopped. After completion of a comparison, shifting of data elements of that specific stage is permitted. As a result of this devise, related data elements on the pipelines in the two directions can be avoided from passing without undergoing determination before completion of the comparison.

However, with this configuration, since the specific stage which may pose the problem requires a stop operation, completion of a comparison, and a shift operation of data elements, data elements repeat shifting and stopping in an irregular schedule in correspondence with respective stage statuses. Due to repetition of such irregular schedule, pipelines for data processing are disturbed, thus interfering with improvement of a throughput as an advantage to be obtained when the pipeline configuration is adopted.

On the other hand, as the best application fields when the aforementioned data processing technique is used, an image processing field and graphics processing field which execute high-speed data processing of a very large number of data elements in the pipeline configuration are known. In recent years, in such fields, various kinds of image processing are required to enhance image quality and functions of products. For example, time-division multiplexing image processing is concurrently applied to a plurality of contents (images, video pictures), and a plurality of translucent texture data are superimposed. Such image processing normally reads out and processes required image data and video data from an external memory such as a DRAM. In this case, it is a common practice to acquire data from the external memory via a cache apparatus.

However, in case of the time-division multiplexing image processing and the processing for superimposing a plurality of translucent textures, it is required to simultaneously and parallelly process various image data and video data, and image data or video data as one target data is intermittently acquired from the external memory. When image data and video data as various target data are intermittently acquired from the external memory in the general implementation of a cache technique, cache conflicts frequently occur, thus considerably lowering a cache performance. In order to avoid such cache conflicts, the number of ways of cache tags may be increased. However, when there are many ways in the general implementation of a cache technique, the number of logic stages of selectors in determination stages increases, and it becomes difficult to allow timings to converge in respective stages. For this reason, it is difficult to perform operations at a high operating frequency. Also, by increasing the number of ways, replace control at the time of cache conflicts is complicated, and it is difficult to implement the cache technique.

SUMMARY OF THE INVENTION

The present invention has been made in consideration of the aforementioned problems.

An information processing apparatus according to the present invention comprises the following arrangement. That is, an information processing apparatus comprising: a first pipeline which has a plurality of first nodes, and shifts first data held in a first node of interest to a first node which is located in a first direction with respect to the first node of interest; a second pipeline which has a plurality of second nodes respectively corresponding to the first nodes of the first pipeline, and shifts second data held in a second node of interest to a second node which is located in a second direction opposite to the first direction with respect to the second node of interest; a processing unit configured to execute data processing using the first data and the second data; and a reorder unit configured to hold one of the output second data based on attribute information of the second data output from the second pipeline.

According to the present invention, in an information processing apparatus which executes processing using pipelines, replace control is devised to avoid repetitively required data from being discarded from the information processing apparatus, thus providing an efficient technique.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A to 13C are views for explaining operation examples of the related art.

DESCRIPTION OF THE EMBODIMENTS

Embodiments of the present invention will now be described in detail in accordance with the accompanying drawings.

(Basic Arrangement)

Figure 1:
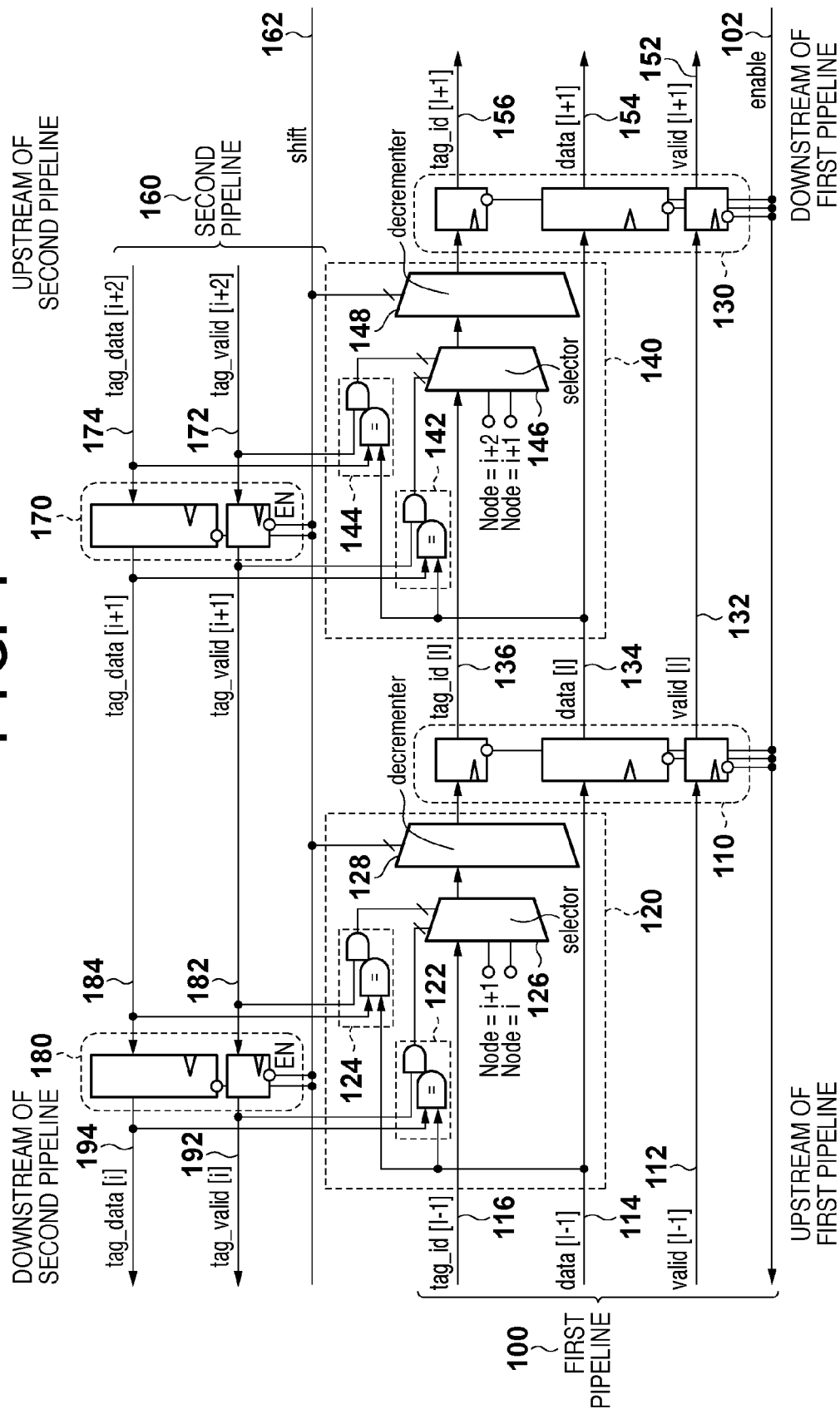
FIG. 1 is a block diagram showing an example of the basic arrangement of a data processing apparatus.

FIG. 1 is a block diagram showing an example of the basic arrangement of an information processing apparatus (to be referred to as a data processing apparatus hereinafter) according to an embodiment of the present invention. As shown in FIG. 1, each pipeline has a plurality of nodes which serve as holding units of data. In this case, a first pipeline 100 has a predetermined number of (eight) first nodes (first holding units). By selecting one of these first nodes as a node of interest, the first pipeline 100 shifts a data element (first data) from the node of interest to a neighboring first node on the downstream side in a first direction at a predetermined cycle. The shift direction at this time will be referred to as "first shift direction" and the process of shifting will be referred to as "first shifting process" hereinafter. The first pipeline 100 externally receives a data element valid signal "valid[l−1]" 112, a data signal "data[l−1]" 114, and a processing result signal "tag_id[l−1]" 116 as a processing result of a data signal. These series of input signals are processed by a data processing circuit 120 which executes various kinds of data processing, and are then temporarily stored in a pipeline register 110.

This pipeline register 110 temporarily stores data elements after data processing when a drive signal "enable" 102 is valid (asserted), thereby updating the previously stored data elements. However, when the drive signal "enable" 102 is invalid (deasserted), this pipeline register 110 does not store data elements after data processing, and holds the previously stored data elements intact. Hence, the data elements are not updated. An interval from inputs until signals are temporally stored in the pipeline register 110 will be referred to as a stage (first stage) hereinafter.

Next, the pipeline register 110 outputs a data element valid signal "valid[l]" 132, data signal "data[l]" 134, and processing result signal "tag_id[l]" 136. Then, a data processing circuit 140 executes various kinds of data processing as in the first stage. Furthermore, a data element after processing is temporarily stored in a second pipeline register 130. This storage operation is the same as that in the first stage. An interval until data elements from the pipeline register 110 are temporarily stored in the pipeline register 130 will be referred to as a second stage hereinafter.

Furthermore, the pipeline register 130 outputs a data element valid signal "valid[l+1]" 152, data signal "data[l+1]" 154, and processing result signal "tag_id[l+1]" 156. With this operation, in the first pipeline 100, the data elements (the valid signal "valid", data signal "data", and processing result signal "tag_id") shift from the left side on the plane of the drawing as "upstream" to the right side on the plane of the drawing as "downstream".

On the other hand, the arrangement shown in FIG. 1 includes a second pipeline in addition to the first pipeline. This second pipeline has second nodes (second holding units) associated with the eight first nodes of the first pipeline, and shifts a data element (second data) held in a second node of interest to a second node which is located in a direction (second direction) opposite to the first direction as the shift direction of the first pipeline. More specifically, the second pipeline 160 shifts data elements from the right side on the plane of the drawing as "upstream" to the left side on the plane of the drawing as "downstream". The shift direction at this time will be referred to as "second shift direction", and the process of shifting will be referred to as "second shifting process" hereinafter.

The second pipeline 160 externally receives a data element valid signal "tag_valid[i+2]" 172 and data signal "tag_data[i+2]" 174. These input signals are used by the aforementioned data processing circuit 140. After that, these signals are temporarily stored in a pipeline register 170.

This pipeline register 170 temporarily stores the valid signal "tag_valid[i+2]" 172 and data signal "tag_data[i+2]" 174 as the series of input signals when a drive signal "shift" 162 is valid. Then, the pipeline register 170 updates the previously stored data elements.

On the other hand, the pipeline register 170 holds the previously stored data elements intact without storing the series of input signals when the drive signal "shift" 162 is invalid (deasserted). Hence, the pipeline register 170 does not update the data elements. An interval from inputs until signals are temporally stored in the pipeline register 170 will be referred to as a stage (first stage) hereinafter.

Next, the pipeline register 170 outputs a data element valid signal "tag_valid[i+1]" 182 and data signal "tag_data[i+1]" 184, which are input to the data processing circuit 120 as in the first stage. After data processing, these signals are temporarily stored in a second pipeline register 180. This storage operation is the same as that in the first stage. An interval until the data elements from the pipeline 170 are temporarily stored in the pipeline register 180 will be referred to as a second stage hereinafter.

Furthermore, the pipeline register 180 outputs a data element valid signal "tag_valid[i]" 192 and data signal "tag_data[i]" 194. With this operation, in the second pipeline 160, the valid signals "tag_valid" and data signals "tag_data" as data elements shift from the right side on the plane of the drawing as "upstream" to the left side on the plane of the drawing as "downstream".

(Data Processing Circuit)

The data processing circuits 120 and 140 will be described below. Each of the data processing circuits 120 and 140 compares data elements "data" and "tag_data" in two directions. If these data match and the data processing circuit judges that the two data are equal to each other, it stores a storage number ("[i]", "[i+1]", or "[i+2]" described above) of "tag_data" as "tag_id". Then, "tag_id" shifts from the left side on the plane of the drawing as "upstream" to the right side on the plane of the drawing as "downstream" as the data processing result of the first pipeline in synchronism with "data". In this manner, in the signal "tag_id[l]" 136, the storage number of the data element of the second pipeline 160, which has a value equal to the l-th data element "data[l]" 134 of the first pipeline 100, is set.

More specifically, the data processing circuit 120 compares the data signals "data[l−1]" 114 and "tag_data[i]" 194 using a comparison circuit 122 (first comparison circuit) when the valid signal "tag_valid[i]" 192 is valid. Then, if the comparison result indicates that the two data are equal to each other, a selector 126 selects "Node=i" as a storage number of the data signal "tag_data[i]" 194. This selected value is set in the signal "tag_id[l−1]" 116 as a storage number of the data element in the second pipeline 160, which has a value equal to the data signal "data[l−1]" 114 in the first pipeline 100.

As described in the related art, when the first and second pipelines 100 and 160 operate at the same time, a comparison may fail in some cases. To solve this problem, the data processing circuit 120 further compares the data signals "data[l−1]" 114 and "tag_data[i+1]" 184 using a comparison circuit 124 (second comparison circuit) when the valid signal "tag_valid[i+1]" 182 is valid. Then, if the comparison result indicates that the two data are equal to each other, the selector 126 preferentially selects "Node=i+1" as a storage number of the signal "tag_data[i+1]" 184.

On the other hand, if the two data are not equal to each other as a result of this comparison, the selector 126 selects the input processing result signal "tag_id[l−1]" 116. When the external drive signal "shift" 162 is valid (asserted), and the second pipeline 160 operates, the data elements shift to the left side on the plane of the drawing as "downstream". Therefore, in this case, it is correct if the storage number of "tag_data" indicates a left-neighboring storage number. Hence, the storage number is adjusted by subtracting 1 from the selection result of the selector 126 using a decrementer (subtractor) 128.

The storage number selection method will be supplemented below. One of the storage numbers "Node=i", "Node=i+1", and "tag_id[l−1]" 116 is selected. This selection criterion can be simple like, for example, "preferentially select a larger number". For example, a case will be examined below wherein when the data signals "data[l−1]" 114 and "tag_data[i+1]" 184 are equal to each other, the external drive signal "shift" 162 is valid. In this case, in order to avoid the aforementioned problem of the case of a comparison failure, it is important to select "Node=1+i", and this operation matches a method "preferentially select a larger number".

On the other hand, when the external drive signal "shift" 162 is invalid, the aforementioned problem of the case of a comparison failure need not be avoided, and "Node=i+1" need not be selected. However, the data signals "data[l]" 134 and "tag_data[i+1]" 184 are compared once again in the second stage as the downstream stage of the first pipeline irrespective of whether or not to select "Node=i+1" in this stage. For this reason, when the external drive signal "shift" 162 is invalid, the comparison with the signal "tag_data[i+1]" 184 in the first stage may or may not be executed. Conversely, the storage number can also be selected by the method "preferentially select a larger number". A value selected in this way is set in the signal "tag_id[l−1]" 116 indicating the storage number of the data element of the second pipeline 160, which has a value equal to the signal "data[l−1]" 114.

FIG. 1 is presented for the exemplary purpose only. Of course, the drive signal "shift" 162 may be substituted in the selector 126 to execute the control not to select "Node=i+1" when the external signal "shift" 162 is invalid. In the above description, when both the comparison circuits 122 and 124 determine <false>, the input data signal "tag_id[l−1]" 116 is selected. In this case, in order to cope with a case in which the storage location shifts to "downstream" when the external signal "shift" 162 is valid, the storage number has to be adjusted by decreasing 1 from the selection result in any case. For this reason, the control not to select "Node=i+1" is not executed, and after "Node=i+1" is selected, the storage number is adjusted by subtracting 1 from the selection result.

The same applies to the data processing circuit 140. When the valid signal "tag_valid[i+1]" 182 is valid, the data signals "data[l]" 134 and "tag_data[i+1]" 184 are compared using a comparison circuit 142. Then, if the comparison result indicates that the two data are equal to each other, a selector 146 selects "Node=i+1" as the storage number of the signal "tag_data[i+1]" 184. To prepare for the operation of the second pipeline 160, the data processing circuit 140 further compares the data signals "data[l]" 134 and "tag_data[i+2]" 174 using a comparison circuit 144 when the valid signal "tag_valid[i+2]" 172 is valid. If the comparison result indicates that the two data are equal to each other, the selector 146 preferentially selects the storage number "Node=i+2" of the signal "tag_data[i+2]" 174. On the other hand, when both the comparison results indicate that the two data are not equal to each other, the selector 146 selects the processing result signal "tag_id[l]" 136.

When the external drive signal "shift" 162 is valid, and the second pipeline 160 operates, the storage number of "tag_data" shifts by one to the right side on the plane of the drawing as "downstream". For this reason, the storage number is adjusted by subtracting 1 from the selection result of the selector 146 using a decrementer (subtractor) 148. In this manner, the detection result is adjusted, and accurate, high-speed data processing can be attained by simple processing.

As described above, data elements, which shift in opposite directions, can be surely and quickly compared in the respective stages of the pipelines. Each of the data processing circuits 120 and 140 has one comparison circuit with a data element as a comparison target of the second pipeline 160 per data element of the first pipeline 100. Furthermore, each of the data processing circuits 120 and 140 newly has a comparison circuit with an "upstream" data element of the second pipeline 160 for a data element as a comparison target of the second pipeline 160 under the assumption that the second pipeline 160 operates. Thus, since the problem of interlocking (internal stalling) for each specific stage, which occurs in the arrangement of Japanese Patent No. 3588487, can be avoided, a high processing performance can be attained without always stopping data processing.

In order to calculate a storage location when two data elements are equal to each other, each of the data processing circuits 120 and 140 includes the decrementer (subtractor) which decrements the processing result by 1 under the assumption that the second pipeline 160 operates. Then, the storage numbers of data elements of the second pipeline are assigned in advance, so as to be incremented like "0, 1, 2, . . . , i, i+1, i+2, . . . , N−1 (i and N are positive numbers, i<N)" from "downstream" toward "upstream" of the second pipeline. A merit of such assignment will be described later. When the storage numbers are assigned in a reverse sequence, the decrementer serves as an incrementer which increments the processing result by 1, as a matter of course.

Figure 2:
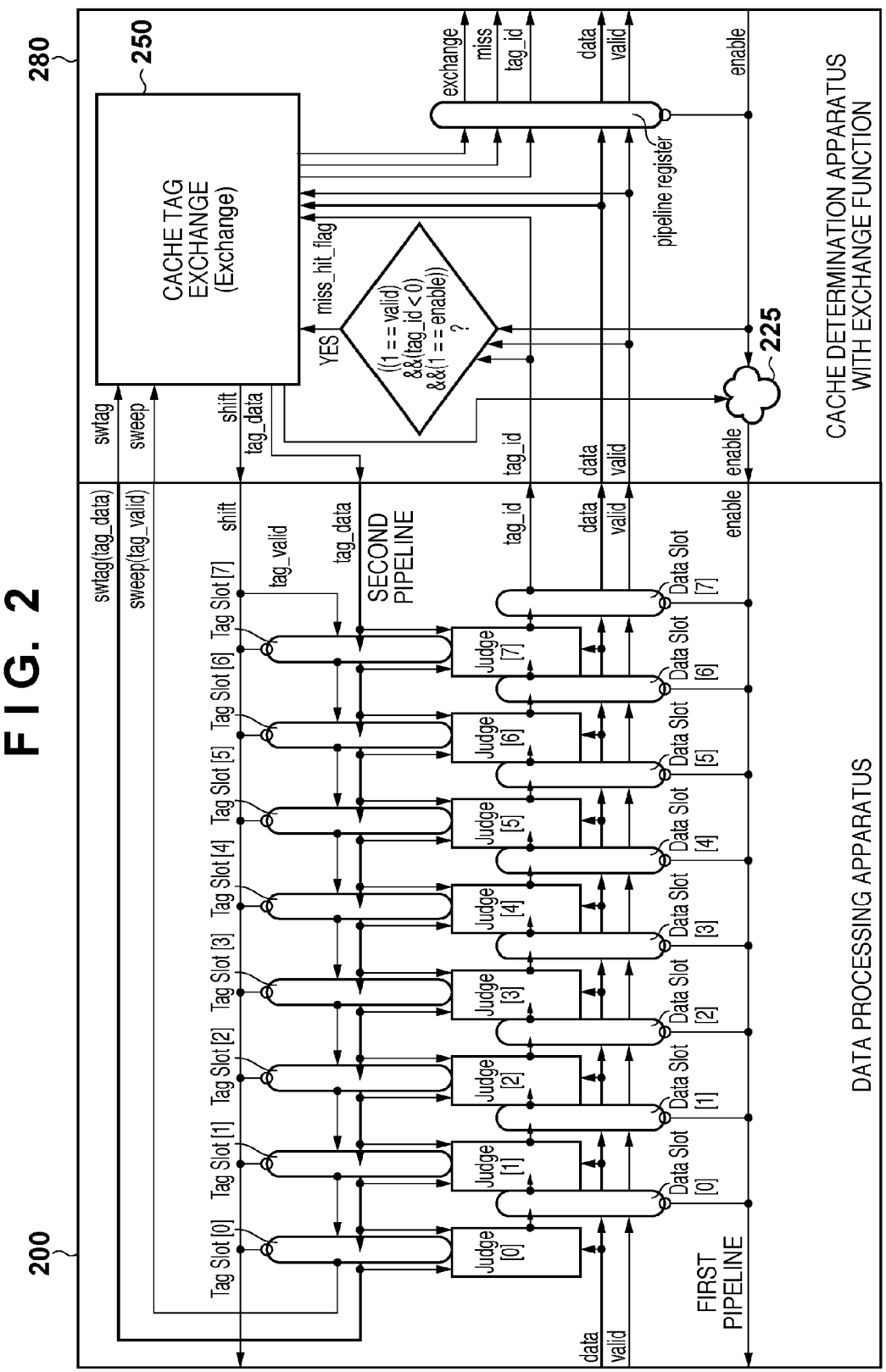
FIG. 2 is a block diagram showing an example of a cache tag determination unit to which the data processing apparatus is applied.

FIG. 2 shows an example of the arrangement of a data processing apparatus in case of N=8 (eight stages) by combining N (N: an integer) basic arrangements shown in FIG. 1. In the example of a data processing apparatus 200 shown in FIG. 2, eight data elements of the first and second pipelines are compared. In FIG. 2, TagSlot[0] to TagSlot[7] correspond to the pipeline registers 170 and 180 of the second pipeline shown in FIG. 1. Also, DataSlot[0] to DataSlot[7] correspond to the pipeline registers 110 and 130 of the first pipeline shown in FIG. 1. Furthermore, Judge[0] to Judge[7] correspond to the data processing circuits 120 and 140 shown in FIG. 1. By coupling the basic arrangements in this way, many data elements can be parallelly distributed and compared by pipeline operations.

In the arrangement example of the data processing apparatus 200 shown in FIG. 2, comparisons with eight data elements are implemented by pipelines of eight stages. In this case, even when the external drive signal "shift" is valid, and the second pipeline shifts to "downstream", perfect comparisons can be realized without lowering a processing performance.

Furthermore, as shown in FIG. 2, by adding a cache determination apparatus 280 with an exchange function to the data processing apparatus 200, a high-speed full/set-associative cache apparatus, which can be used in advanced image processing, can be implemented. That is, in this case, assuming that memories to be used are DRAMs, the cache has pieces of tag information of all the DRAMs. An image processing apparatus which incorporates this cache apparatus, and the cache apparatus will be described below.

(Image Processing Apparatus)

Figure 5:
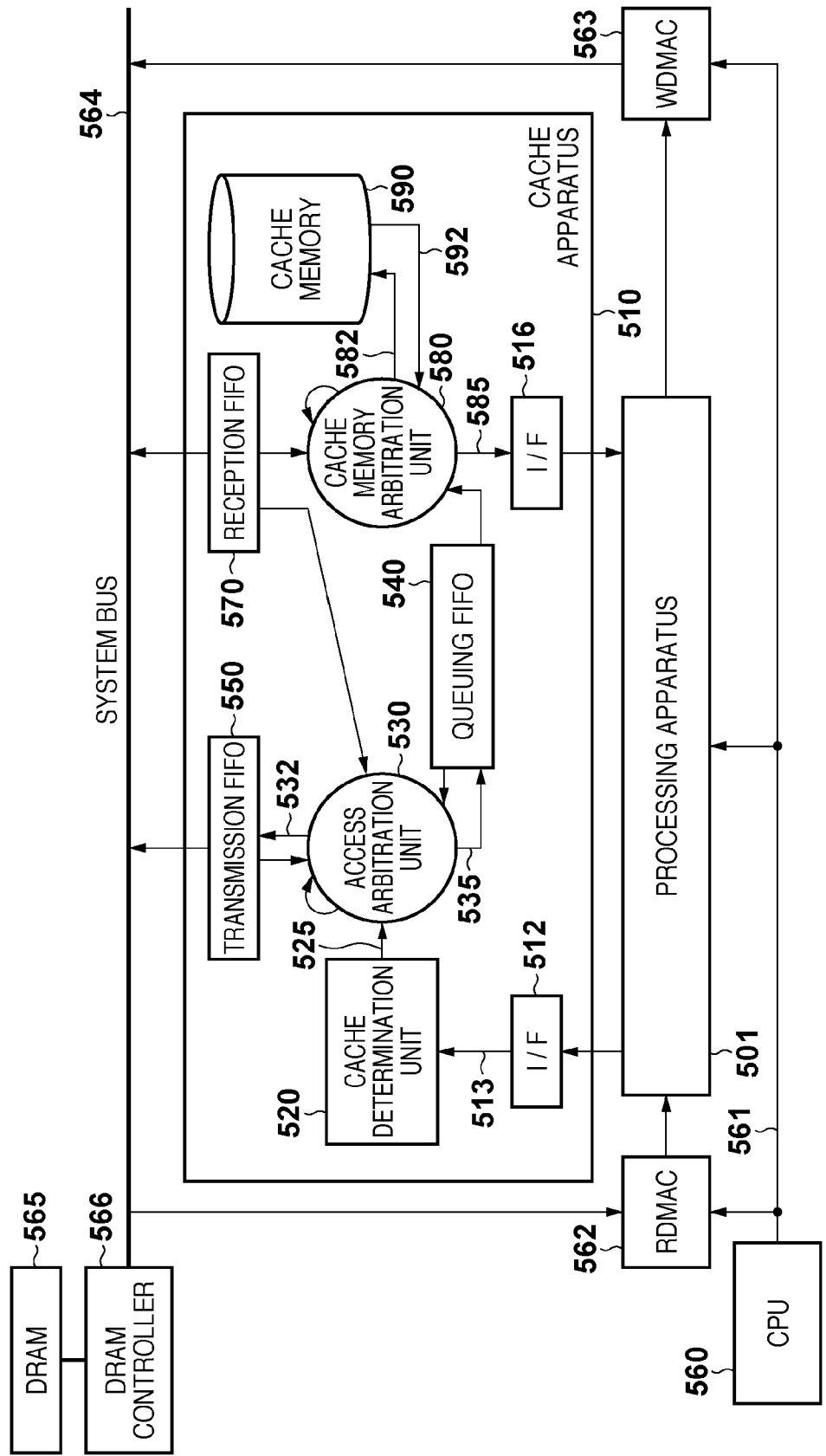
FIG. 5 is a block diagram showing an example of an image processing apparatus to which the data processing apparatus is applied.

FIG. 5 is a block diagram showing an example of the overall arrangement of an image processing apparatus. To the image processing apparatus shown in FIG. 5, the data processing apparatus described using FIG. 2 is applied as a full/set-associative cache determination unit 520.

The image processing apparatus includes a CPU 560, a DRAM 565 as an external memory, a DRAM controller 566, and a system bus 564. Also, the image processing apparatus includes an RDMAC 562 as a DMAC (Direct Memory Access Controller) for data read accesses, and a WDMAC 563 for data write accesses, so as to control read and write accesses to the DRAM 565. The image processing apparatus includes a processing apparatus 501 which executes, for example, image processing, and a cache apparatus 510 according to the present invention. Note that the image processing apparatus can include an arbitrary number of processing apparatuses, each of which may be configured by pipeline circuits that execute high-speed permanent processing, or may be configured by a processor and programs, which can flexibly change the processing contents although the processing speed is low.

The CPU 560 controls the RDMAC 562, WDMAC 563, and processing apparatus 501 via a control bus 561, thus systematically controlling the entire image processing apparatus. The RDMAC 562 reads out image data stored in the DRAM 565 via the system bus 564 and DRAM controller 566, and inputs the readout data to the processing apparatus 501 in accordance with an instruction from the CPU 560. The processing apparatus 501 executes desired image processing, and outputs image data as the processing result to the WDMAC 563. At this time, the WDMAC 563 stores the image data received from the processing apparatus 501 in the DRAM 565 via the system bus 564 and DRAM controller 566 in advance based on an instruction from the CPU 560. The image processing apparatus implements image processing by executing the aforementioned series of operations.

During the process of the aforementioned image processing, the processing apparatus 501 reads out various required target data (image data, video data, setting values, tables, attribute information, etc.) from the DRAM 565 via the connected cache apparatus 510, and uses them in the image processing. Also, when the processing apparatus 501 is configured by a processor and programs, programs are read out as needed via the cache apparatus 510 to execute processing.

(Cache Apparatus)

The operation of the cache apparatus will be described below. The aforementioned processing apparatus 501 inputs a storage address 513 of data on the DRAM 565 to the cache determination unit 520 via an I/F 512 when it reads out data from the DRAM 565 via the cache apparatus. Then, based on the input storage address 513, the cache determination unit 520 determines a cache hit or cache miss.

(Cache Determination Unit)

An example of the circuit arrangement of the cache determination unit 520 in the image processing apparatus shown in FIG. 5 will be described below with reference to FIG. 2. The cache determination unit 520 checks the magnitude relationship between the comparison result and the number of cache tags to determine a cache hit. The cache determination unit 520 includes the data processing apparatus 200 and a cache determination apparatus 280 with an exchange function, both shown in FIG. 2. Note that the "cache determination apparatus 280 with the exchange function" will be simply referred to as a "cache determination apparatus 280" hereinafter.

The aforementioned storage address 513 includes an address valid signal "valid" and address signal "data". The storage address 513 shifts via the DataSlot of the first pipeline of the data processing apparatus 200. The data processing apparatus 200 has eight data "tag_data", which store cache tag information. An example of the data processing apparatus 200 is a full/set-associative cache apparatus having eight indices. Storage locations of Nos. 0 to 7 are set in advance in a predetermined order in turn from "upstream" of the second pipeline, and have a shift structure in which data elements shift toward "downstream" when the drive signal "shift" is valid (asserted). With this shift structure, the oldest cache tag is stored in "tag_data" at the storage location No. 0, and the latest cache tag is stored in "tag_data" at the storage location No. 7.

Every time a cache miss of the cache has occurred, cache tags are shifted from "tag_data" at the storage location No. 7 toward that at the storage location No. 0 in turn, and are then swept out from the second pipeline. This cache determination unit 520 always discharges cache tags and cache data in turn from the oldest ones although it has a very simple mechanism. With such simple mechanism, the need for complicated replace control of a general cache mechanism can be obviated. However, even a cache tag and cache data having a high use frequency ("hit count value" to be described later) are discarded at some future time when a cache miss occurs frequently.

Hence, in order to solve this problem, the cache apparatus shown in FIG. 5 has a function of exchanging a cache tag to be discarded from the second pipeline with that temporarily stored in a reorder buffer of the cache determination apparatus 280. Then, the cache tag temporarily stored in the reorder buffer can be returned to the second pipeline. These features will be explained later in paragraphs of "exchange function of cache tag/cache data scheduled to be discarded" and "return function of cache tag/cache data scheduled to be discarded".

(Cache Determination)

A cache hit/cache miss determination sequence will be described below. A hit/cache miss is determined by the cache determination apparatus 280 shown in FIG. 2. Whether or not a cache hits is determined by checking a 1-bit sign bit of a processing result signal "tag_id" (a complement expression of 2) output from the data processing apparatus 200. When a valid signal "valid" output from the data processing apparatus 200 is valid (asserted), and the sign bit is 1, "tag_id" assumes a negative value, and a cache miss is determined as a cache determination result. When the sign bit is 0, "tag_id" assumes a positive value, and a hit is determined as a cache determination result.

A data signal "data" output from the data processing apparatus 200 is input to the cache determination apparatus 280 in synchronism with "tag_id". Thus, when a cache miss is determined, this data signal "data" is used as an address "miss_hit_address" at the time of the cache miss. Then, the cache determination apparatus 280 validates the drive signal "shift" at the time of the cache miss, and inputs the address "miss_hit_address" at the time of the cache miss as the data signal "tag_data" of the data processing apparatus 200. Every time the cache causes a cache miss, the drive signal "shift" is validated, and the processing result "tag_id" is decremented, as described above.

Even when the processing result "tag_id" initially holds a positive value, when a cache miss repetitively occurs, the second pipeline is shifted to often sweep out "tag_data" which represents a cache tag from the second pipeline. As can be seen from the above description, the processing result "tag_id" when it is swept out assumes a negative value since the storage number of the oldest cache tag is 0. The reason why the sign of "tag_id" need only be checked in the aforementioned cache determination is derived from this. That is, the assignment method of the numbers of the storage locations is devised so that the oldest cache tag is stored in the storage location of No. 0 and the latest cache tag is stored in the storage location of No. N−1. In this way, the cache determination need only discriminate the sign of the data processing result of the final stage. Therefore, according to the arrangement shown in FIG. 5, the cache determination is very simple.

When the storage numbers 0 to N−1 are assigned in turn from "upstream" to "downstream" of the second pipeline, the cache determination can be attained by checking whether or not the value of "tag_id" is smaller than N as the number of elements of the second pipeline, needless to say. Since the mechanism which always discards cache data in turn from the oldest one is adopted, as described above, a ring type FIFO can be used as a cache memory. In this case, the cache determination unit 520 can be easily synchronized with a cache memory (FIFO) 590. Note that when the cache determination result indicates a hit, desired cache data is stored in a cache memory at a location indicated by "tag_id".

With the aforementioned processing, the cache determination unit 520 outputs the following signals as a determination result 525 based on the input storage address 513.

a data element valid signal "valid"
an address signal "miss_hit_address" as a data storage destination of the DRAM at the time of a cache miss
"tag_id" as a storage destination of cache data
a cache determination result "miss_hit_flag"
a reorder buffer selection signal "reorder" or reorder buffer return signal "rebirth"
a cache data exchange signal "exchange"

Note that the operations of the reorder buffer selection signal "reorder", reorder buffer return signal "rebirth", and cache data exchange signal "exchange" will be described later respectively in the paragraphs of "exchange function of cache tag/cache data scheduled to be discarded" and "return function of cache tag/cache data scheduled to be discarded".

The aforementioned image processing apparatus adopts a non-blocking cache mechanism so as to hide a refill latency as a penalty at the time of a cache miss of the cache. Even when the determination result 525 indicates a cache miss, the determination result 525 including pieces of information "tag_id, miss_hit_flag, reorder (rebirth), exchange" which are required later is saved in a queuing FIFO 540. Before completion of processing for reading out cache data corresponding to a cache miss from the DRAM 565 and storing the readout data in the cache memory (FIFO) 590, cache determination processing of the next pixel is executed prior to that processing. With this processing, while cache data corresponding to a cache miss is refilled from the DRAM 565 in the cache memory 590 (FIFO), the cache determination of the next pixel can be executed. Therefore, a performance drop at the time of a cache miss of the cache can be suppressed.

Note that a storage address at the time of a cache miss of the cache is sequentially stored in a transmission FIFO 550 by an access arbitration unit 530, as will be described later. The DRAM controller 566 receives a storage address from this transmission FIFO 550, reads out desired data from the DRAM 565, and writes the readout data in a reception FIFO 570. A cache memory arbitration unit 580 reads out "miss_hit_flag" from the queuing FIFO 540. Then, the DRAM controller 566 determines whether the cache determination result indicates a cache miss or hit. When the cache determination result indicates a hit, the cache memory arbitration unit 580 directly reads out cache data from the cache memory (FIFO) 590, and outputs the readout data to an I/F 516. On the other hand, when the cache determination result indicates a cache miss, the cache memory arbitration unit 580 reads out cache data from the reception FIFO 570, and writes the readout data in the cache memory (FIFO) 590. Then, the cache memory arbitration unit 580 outputs this cache data to the I/F 516. In this manner, a series of processes for reading out cache data corresponding to a cache miss from the DRAM 565 and updating the cache memory (FIFO) 590 by that data will be referred to as refill processing hereinafter.

(Access Arbitration Unit)

The access arbitration unit 530 operates when the valid signal "valid" is valid (asserted), and stands by in other cases. The access arbitration unit 530 executes the following processing according to a valid (asserted)/invalid (deasserted) state of the cache determination result "miss_hit_flag".

As a result of cache determination, when "miss_hit_flag" is valid, the access arbitration unit 530 evaluates the empty states of storage areas of the transmission FIFO 550, reception FIFO 570, and queuing FIFO 540 as the three connected FIFOs. When all of the three FIFOs have empty areas, the access arbitration unit 530 writes the result "tag_id, miss_hit_flag, reorder (rebirth), exchange" 535 in the queuing FIFO 540. At the same time, the access arbitration unit 530 writes the address signal "miss_hit_address" 532 in the transmission FIFO 550. If no empty areas are available, the access arbitration unit 530 invalidates (deasserts) the drive signal "enable" to stop (stall) the cache determination unit 520, and waits until empty areas are formed in the storage areas.

As a result of cache determination, when "miss_hit_flag" is invalid, the access arbitration unit 530 evaluates the empty state of the queuing FIFO 540. If an empty area is available, the access arbitration unit 530 writes the determination result 535 including "tag_id, miss_hit_flag, reorder (rebirth), exchange" in the queuing FIFO 540. If no empty area is available, the access arbitration unit 530 invalidates (deasserts) the drive signal "enable" to stop (stall) the cache determination unit 520, and waits until an empty area is formed in the storage area.

(Cache Memory Arbitration Unit)

The cache memory arbitration unit 580 evaluates whether or not data are stored in the storage areas of the two connected FIFOs, that is, the reception FIFO 570 and queuing FIFO 540. The cache memory arbitration unit 580 reads out "tag_id, miss_hit_flag, reorder (rebirth), exchange" from the cache determination result to be processed in the queuing FIFO 540. Note that when the queuing FIFO 540 is empty, since there is no cache determination result to be processed, the cache memory arbitration unit 580 stands by without any processing. Then, the cache memory arbitration unit 580 executes the following processing according to an invalid (deasserted) state or valid (asserted) state of the cache determination result "miss_hit_flag".

As a result of cache determination, when "miss_hit_flag" is invalid (deasserted), the cache is in a hit state. Hence, the cache memory arbitration unit 580 calculates a storage address of the cache memory (FIFO) 590 based on "tag_id" read out from the queuing FIFO 540 at the same time and a write pointer of the cache memory (FIFO) 590. The cache memory arbitration unit 580 directly reads out cached data from the cache memory (FIFO) 590 based on the calculated storage address as "read_data" 592. Then, the cache memory arbitration unit 580 outputs the readout data as cache data "valid, cache_data" 585 to the I/F 516.

As a result of cache determination, when "miss_hit_flag" is valid (asserted), the cache is in a cache miss state. The cache memory arbitration unit 580 confirms whether or not non-cached data from the DRAM 565 is received by the reception FIFO 570. When such data is not received, the cache memory arbitration unit 580 waits until the data is received. When such data is received, the cache memory arbitration unit 580 reads out cache data to be updated from the reception FIFO 570. Then, the cache memory arbitration unit 580 writes the readout data in a storage area indicated by the write pointer of the cache memory (FIFO) 590 as "write_data" 582. At the same time, the cache memory arbitration unit 580 outputs the readout data to the I/F 516 as cache data "valid, cache_data" 585. Lastly, the cache memory arbitration unit 580 increments the write pointer of the cache memory (FIFO) 590 by 1. When the FIFO size is exceeded, the cache memory arbitration unit 580 resets the write pointer to 0.

Additional functions of the cache memory arbitration unit 580 required to implement "exchange function of cache tag/cache data scheduled to be discarded" and "return function of cache tag/cache data scheduled to be discarded" above will be described later.

Finally, the I/F 516 connected to the processing apparatus outputs the cache data "valid, cache_data" obtained by the above process to the processing apparatus 501.

(Exchange Function of Cache Tag/Cache Data Scheduled to be Discarded)

For example, in printer image processing, most of a sheet surface is often a white background, and data of image processing required to print this white background is repetitively used. It is advantageous upon execution of high-speed image processing to always hold cache tags and cache data corresponding to data having high use frequencies in the cache apparatus. Therefore, it is effective to adopt a mechanism which can avoid the cache tags and cache data having high use frequencies from being discarded due to repetitions of a cache miss. The "exchange function of cache tag/cache data scheduled to be discarded" will be described below.

Figure 3:
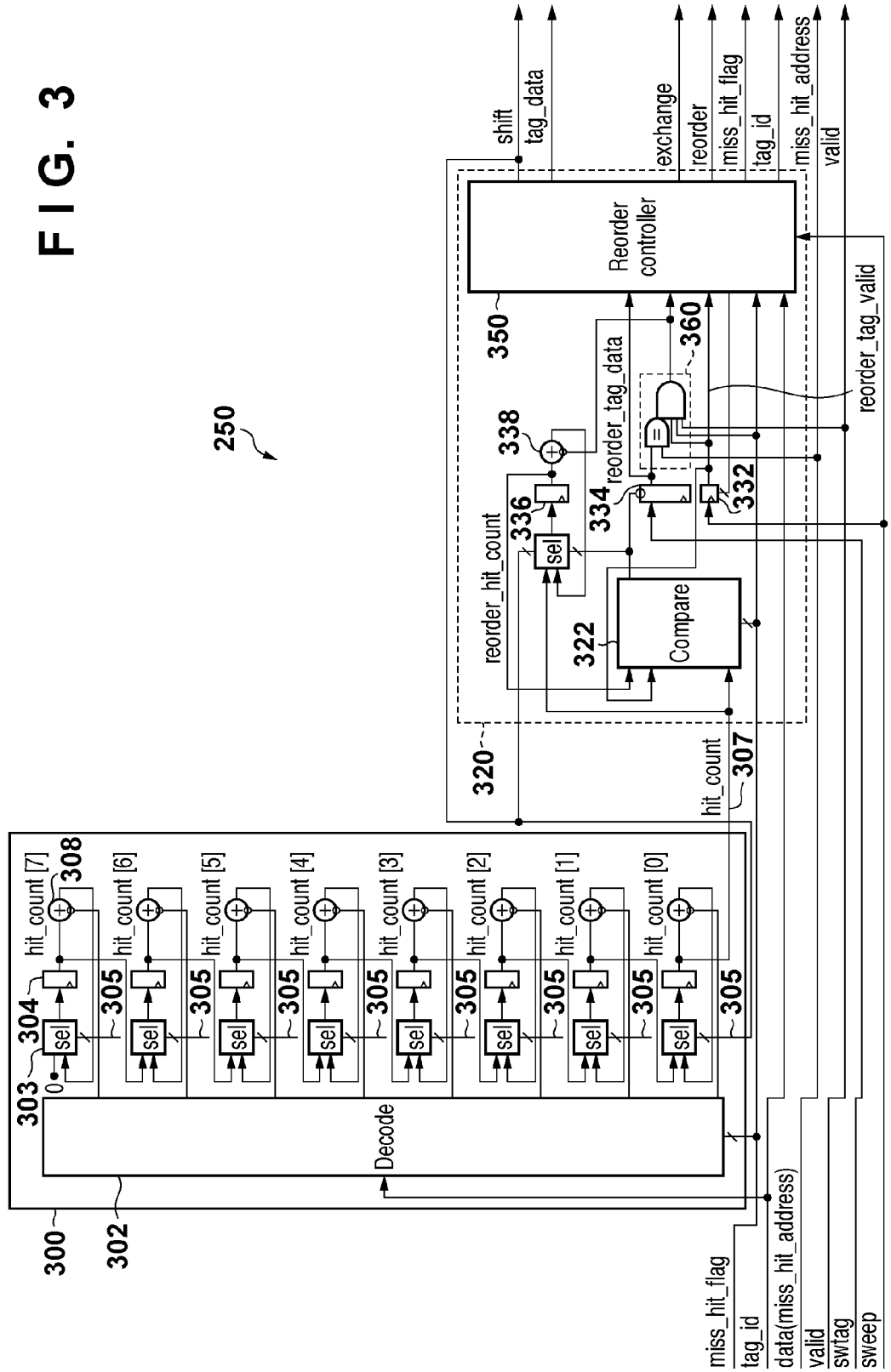
FIG. 3 is a block diagram showing an example of a reorder circuit of the data processing apparatus.
Figure 4:
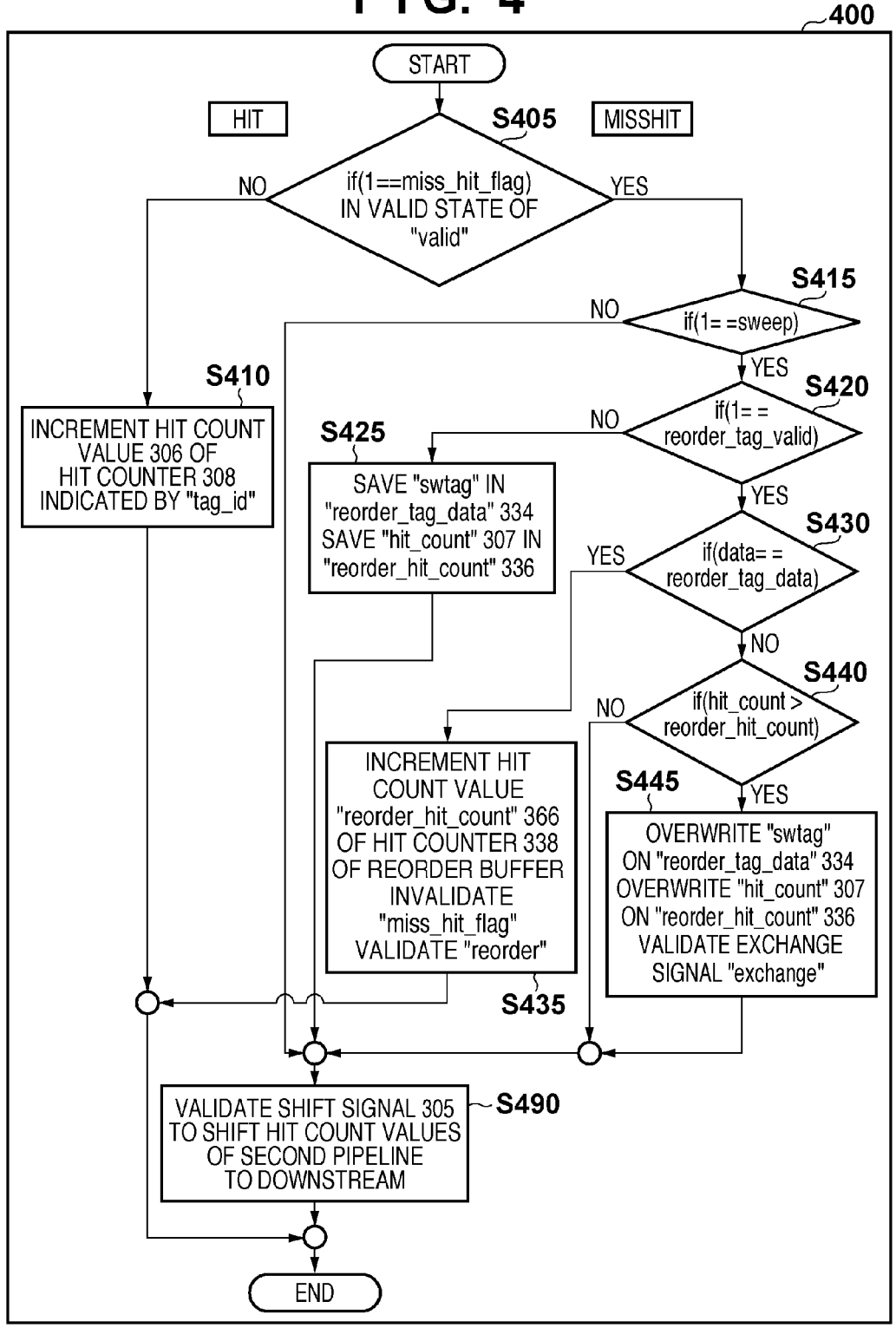
FIG. 4 is a flowchart showing an example of processing of the reorder circuit of the data processing apparatus.

The aforementioned cache determination apparatus 280 includes a cache tag exchange circuit 250. FIG. 3 is a block diagram of the cache tag exchange circuit 250. Also, FIG. 4 shows a flowchart 400 used to explain the processing of the cache tag exchange circuit 250. To the cache tag exchange circuit 250 shown in FIG. 3, the first pipeline outputs the following signals.

a data element valid signal "valid"

an address signal "miss_hit_address" as a data storage destination of the DRAM at the time of a cache miss "tag_id" as a storage destination of cache data.

To the cache tag exchange circuit 250, the second pipeline outputs the following signals.

a valid signal "sweep" of a cache tag scheduled to be discarded a cache tag "swtag" scheduled to be discarded Furthermore, the cache determination result "miss_hit_flag" processed by a determination unit 260 of the cache determination apparatus 280 is input to the cache tag exchange circuit 250.

The cache tag exchange circuit 250 includes a hit count value calculation circuit 300 which counts use frequencies for respective cache tags, and a reorder circuit 320 which temporarily holds a cache tag scheduled to be discarded when the use frequency of that cache tag is high. When the data element valid signal "valid" as the input to the cache tag exchange circuit 250 is invalid (deasserted), the cache tag exchange circuit 250 waits without any processing (not shown in the flowchart 400). When the data element valid signal "valid" is valid (asserted), and the cache determination result "miss_hit_flag" is invalid (deasserted), the determination result of the data processing apparatus 200 indicates a cache hit.

If the data element valid signal "valid" is valid (asserted), and the cache determination result "miss_hit_flag" is valid (asserted) in step S405, the determination result of the data processing apparatus 200 indicates a cache miss. In case of a cache hit, the hit count value calculation circuit 300 is used to accumulate the number of matches of tag_data and data in the eight "Judge"s in FIG. 2, and controls a decode circuit 302 to increment a hit count value 304 of a hit counter 308 indicated by "tag_id" as a storage destination of cache data by 1 in step S410. In case of a cache miss, the cache tag exchange circuit 250 confirms a valid signal "sweep" of a cache tag "swtag" scheduled to be discarded in step S415 to determine whether or not to enable an exchange function.

If the valid signal "sweep" of the cache tag scheduled to be discarded is invalid (deasserted), a control circuit "Reorder controller" 350 need not enable the exchange function. Hence, in step S490, the control circuit "Reorder controller" 350 validates a shift signal "shift" 305 to shift the hit count values 304 from "upstream" to "downstream". At the same time, cache tags of the second pipeline of the aforementioned data processing apparatus 200 also shift from "upstream" to "downstream". In the arrangement shown in FIG. 1, "miss_hit_address" immediately after a cache miss is stored in a cache tag located at the most "upstream" side. Since the hit count value 304 of the cache tag at that time has to be "0" by necessity, when the cache tags shift from "upstream" to "downstream", that hit count value 304 is reset, and zero is given as an initial value of the count value.

On the other hand, if the valid signal "sweep" of the cache tag scheduled to be discarded is valid (asserted) in step S415, the control circuit "Reorder controller" 350 enables the exchange function, and confirms an empty state of a reorder buffer in step S420. If a valid signal "reorder_tag_valid" 332 of the reorder buffer is invalid (deasserted), a reorder buffer "reorder_tag_data" 334 is empty. Therefore, the "Reorder controller" 350 can unconditionally save the cache tag "swtag" scheduled to be discarded in the "reorder_tag_data" 334 in step S425. Also, the "Reorder controller" 350 can count the number of hit times of data scheduled to be discarded in a node of the last stage, and can store and save a hit count value 307 as the count result in a hit count value "reorder_hit_count" 336 of the reorder buffer. In order to attain these save operations, the "Reorder controller" 350 validates (asserts) the shift signal "shift" 305 to shift the hit count value 304 from "upstream" to "downstream". Subsequently, in step S490 as well, cache tags in the second pipeline of the aforementioned data processing apparatus 200 shift from "upstream" to "downstream".

If the valid signal "reorder_tag_valid" 332 of the reorder buffer is valid (asserted) in step S420, the "reorder_tag_data" 334 has already been saved in the reorder buffer. Hence, a comparison circuit 360 compares this "reorder_tag_data" 334 with input "data" in step S430, thus re-evaluating a cache hit determination result. As a result of re-evaluation, if a cache hit is determined (YES in step S430), the "Reorder controller" 350 increments the hit count value "reorder_hit_count" 336 of a hit counter 338 by 1 in step S435. Also, the "Reorder controller" 350 invalidates (deasserts) the input "miss_hit_flag". Also, the "Reorder controller" 350 validates (asserts) the switching signal "reorder" which allows the cache memory arbitration unit 580 to read out the cache data from the reorder buffer.

As a result of re-evaluation in step S430, if a cache miss is determined, the reorder circuit 320 selects one of the "reorder_tag_data" 334 saved in the reorder buffer and the input cache tag "swtag" scheduled to be discarded. In this case, assume that cache data having a larger hit count value that represents a use frequency is more likely to be re-used later. Hence, a magnitude comparison circuit "Compare" 322 compares the hit count value "hit_count" 307 of the cache tag scheduled to be discarded and the hit count value "reorder_hit_count" 336 of the reorder buffer, that is, the two latest count values counted in the last stage of the second pipeline in step S440. If the hit count value "hit_count" 307 of the cache tag scheduled to be discarded is larger in step S440, the process advances to step S445. In step S445, the input cache tag "swtag" scheduled to be discarded is overwritten on the cache tag "reorder_tag_data" 334 of the reorder buffer, and is returned as the first tag_data of the second pipeline. At the same time, the hit count value "hit_count" 307 is overwritten on the hit count value "reorder_hit_count" 336 of the reorder buffer. Then, the exchange signal "exchange" indicating that the cache tag has been exchanged is validated (asserted) and output.

If the hit count value "hit_count" 307 of the cache tag scheduled to be discarded is smaller in step S440, the input cache tag "swtag" scheduled to be discarded is discarded. At the same time, its hit count value "hit_count" 307 is discarded. Finally, the "Reorder controller" 350 validates (asserts) the shift signal "shift" 305 in step S490 to shift the hit count values 304 from "upstream" to "downstream". At the same time, the cache tags of the second pipeline in the aforementioned data processing apparatus 200 shift from "upstream" to "downstream".

As described above, a priority order is set based on the magnitude of the hit count value of the cache tag, and a cache tag held in the reorder circuit is exchanged according to this priority order.

(Additional Function of Cache Memory Arbitration Unit 580)

Figure 6:
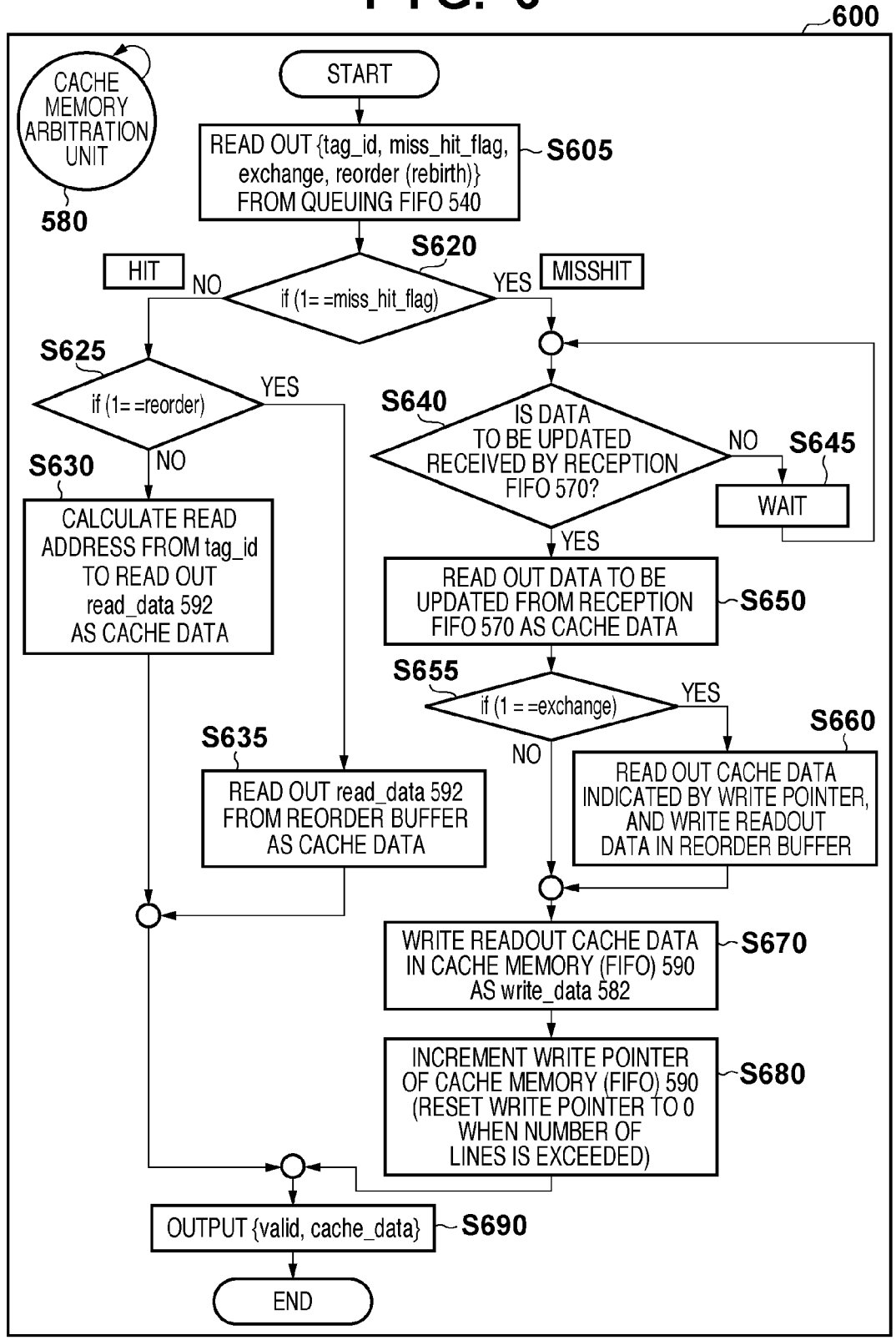
FIG. 6 is a flowchart showing an example of the processing sequence of a cache memory arbitration unit of a cache apparatus to which the data processing apparatus is applied.

FIG. 6 shows an example of the processing sequence of the cache memory arbitration unit. The basic operation of the cache memory arbitration unit 580 is as has been described above. In this case, an operation which is executed in cooperation with the cache tag exchange function will be described below with reference to FIG. 6.

In step S605, the information "tag_id, miss_hit_flag, exchange, reorder" is read out from the queuing FIFO 540. If the cache determination result "miss_hit_flag" is invalid (deasserted) in step S620, the input signal "reorder" indicating whether or not the reorder buffer stores cache data is confirmed in step S625. If the signal "reorder" is valid (asserted) in step S625, the cache data stored in the reorder buffer is directly read out as "read_data" 592 in step S635. In step S690, the "read_data" 592 is output to the I/F 516 as cache data "valid, cache_data" 585.

If the cache determination result "miss_hit_flag" is valid (asserted) in step S620, cache data to be updated is read out from the reception FIFO 570 in step S650. Then, the readout cache data is output to the I/F 516 as cache data "valid, cache_data" 585 in step S690.

On the other hand, if the input exchange signal "exchange" is valid (asserted) in step S655, cache data in a storage area indicated by the write pointer of the cache memory (FIFO) 590 is read out, and is saved in the reorder buffer in step S660. In step S670, data read out from the reception FIFO 570 is written in the storage area indicated by the write pointer as "write_data" 582. Furthermore, in step S680, the write pointer of the cache memory (FIFO) 590 is incremented by 1. When the FIFO size is exceeded, the write pointer is reset to 0.

Note that when the valid signal "sweep" of the cache tag scheduled to be discarded is valid in step S415 in FIG. 4, and valid signal "reorder_tag_valid" 332 of the reorder buffer is invalid in step S420, the cache memory arbitration unit 580 executes the following operation.

In this case, the "Reorder controller" 350 of the reorder circuit unconditionally saves the cache tag "swtag" scheduled to be discarded in the "reorder_tag_data" 334. The cache memory arbitration unit 580 focuses attention on the write pointer of the cache memory (FIFO) 590 to cooperate with this save operation. After initialization of the cache apparatus, the write pointer of the cache memory arbitration unit 580 is 0. Then, every time the cache determination result indicates a cache miss, as described above, the write pointer is incremented by 1. If a next cache miss occurs when the write pointer exceeds the FIFO size and is reset to 0, cache data corresponding to the write pointer=0 is discharged for the first time. That is, the cache memory arbitration unit 580 unconditionally stores, in the reorder buffer, cache data when the write pointer is reset to 0 for the first time.

According to the aforementioned cache apparatus, a full/set-associative cache apparatus which can execute high-speed processing can be realized by a relatively simple arrangement. Since a general direct-map cache determination unit calculates a storage destination of a tag memory used to manage a cache tag from lower bits of an address, a cache conflict is readily caused for an address having a low correlation. Increasing the number of ways of the set-associative system is one solution to reducing the probability of cache conflicts. However, when the number of processing apparatuses becomes large, a large number of ways have to be supported, and the number of logic stages of selectors in a cache determination unit increases, and it becomes difficult to allow timings to converge in the general implementation of a cache apparatus. Therefore, the cache apparatus cannot be operated at a high operating frequency. By contrast, the aforementioned cache determination unit can surely operate even at a high operating frequency since it makes determination using the pipeline configuration.

The aforementioned cache apparatus includes the exchange function which temporarily saves a cache tag and cache data scheduled to be discarded in the reorder buffer, and always holds important cache data according to a hit count value. For this reason, cache data which is repetitively used in image processing is preferentially saved, thus improving cache efficiency.

Examples of the arrangements of the cache determination unit 520 and cache memory arbitration unit 580 shown in FIG. 5 will be described below with reference to FIGS. 7, 8, and 9. The cache determination apparatus 280 has a function of returning a cache tag scheduled to be discarded, which is temporarily saved in the reorder buffer, to the second pipeline of the data processing apparatus 200. A description of the same operations and arrangements as those in the above description will not be repeated.

(Return Function of Cache Tag/Cache Data Scheduled to be Discarded)

As can be seen from the description of the paragraphs of "exchange function of cache tag/cache data scheduled to be discarded", cache tags having large hit count values indicating use frequencies are left stored in the reorder buffer. By returning these cache tags to the second pipeline of the data processing apparatus 200, cache tags of the second pipeline are circulated, and a cache tag with a low use frequency can be preferentially discarded.

Figure 8:
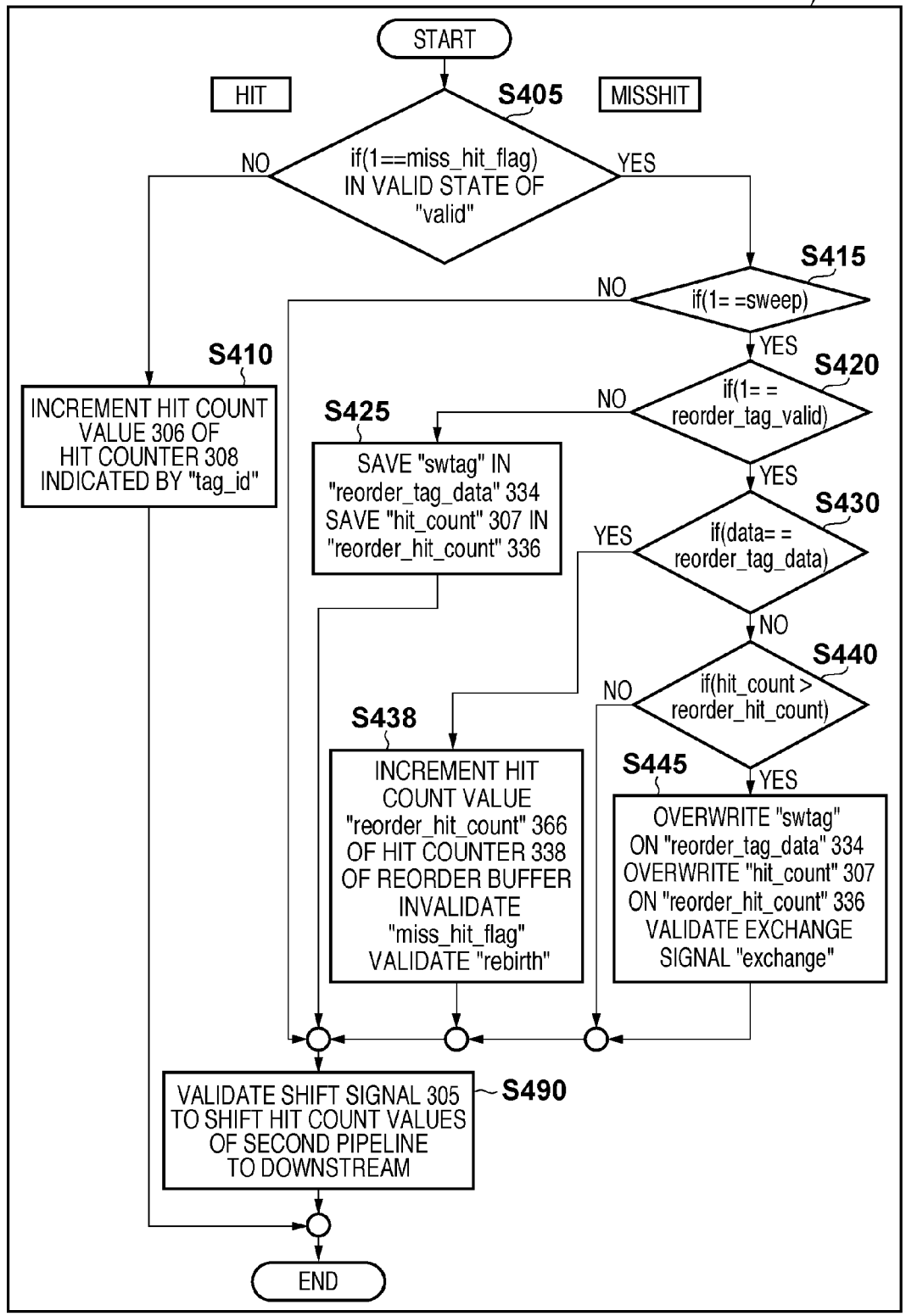
FIG. 8 is a flowchart showing an example of processing of the reorder circuit of the data processing apparatus.
Figure 9:
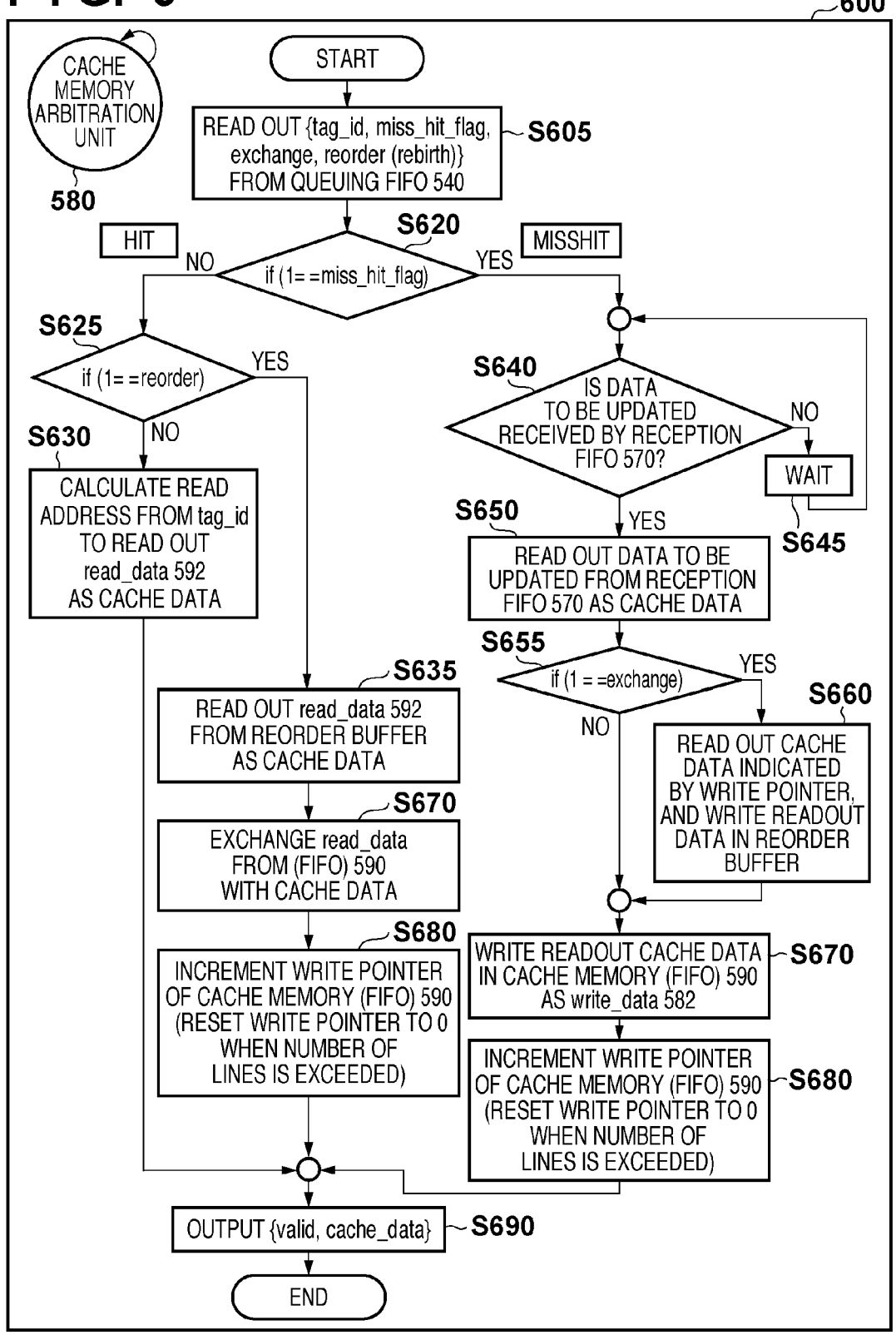
FIG. 9 is a flowchart showing an example of the processing sequence of a cache memory arbitration unit of a cache apparatus to which the data processing apparatus is applied.

In the example of this return function, in the flowchart shown in FIG. 4 or 8, the aforementioned cache hit determination is executed when a hit of the cache tag saved in the reorder buffer is determined in the re-evaluation (YES in step S430). Since the return function is executed at the time of a hit, it can operate exclusively from the downstream shift operation of cache tags at the time of a normal cache miss. In this case, the process in step S435 in FIG. 4 is partially modified, and a return signal "rebirth" shown in step S438 in FIG. 8 is validated (asserted) to inform the cache memory arbitration unit 580 located in the subsequent stage of the operation of the return function.

Figure 7:
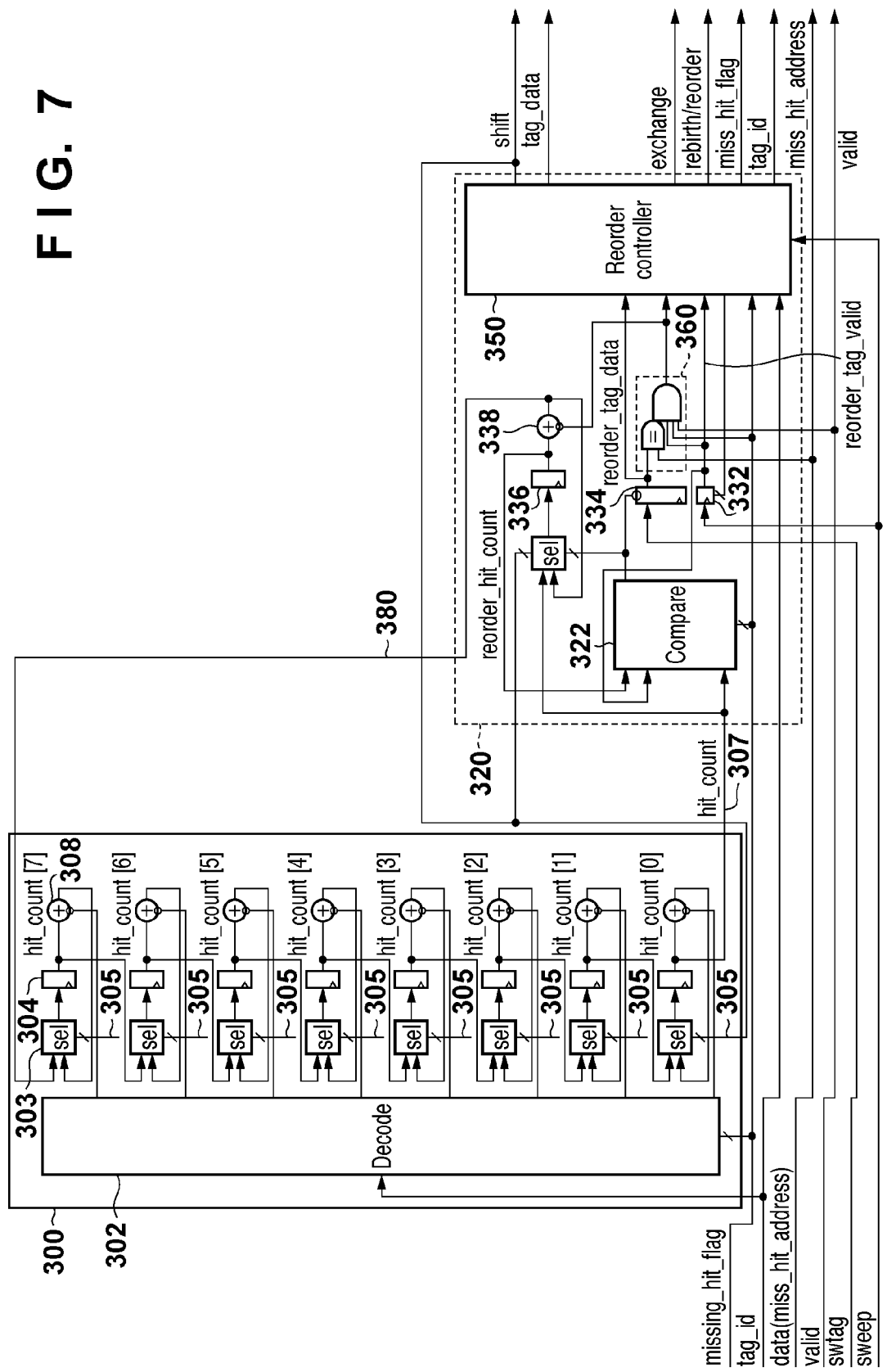
FIG. 7 is a block diagram showing an example of a reorder circuit of the data processing apparatus.

FIG. 7 shows the cache tag exchange circuit 250 including the return function. In FIG. 7, the hit count value 336 of the reorder buffer can be returned to the hit count value 304 of a cache tag which is located at the most "upstream" position of the hit count value calculation circuit 300 via a line 380 unlike in FIG. 3. With this operation of the return function, registers which hold the cache tag 334 and hit count value 336 of the reorder buffer become empty. Hence, at the time of the operation of the return function, an externally input cache tag "swtag" scheduled to be discarded and its valid signal "sweep" are stored in the cache tag 334 of the reorder buffer. Also, the hit count value "hit_count" 307 located at the most "downstream" position is stored in the hit count value 336 of the reorder buffer.

Note that this return function may be executed in response to an external interrupt instruction (trigger). Also, this return function may be executed when the "hit_count" 307 of the cache tag scheduled to be discarded and the "reorder_hit_count" 326 of the cache tag of the reorder buffer are always monitored, and the "reorder_hit_count" 326 is larger.

As described above, a priority order is set according to the magnitude of the hit count value of the cache tag, and the cache tag of the reorder circuit is returned (re-input) to the second pipeline according to this priority order.

(Additional Function of Cache Memory Arbitration Unit 580)

The basic operation of the cache memory arbitration unit 580 is as has been described above. In this case, an operation which is executed in cooperation with the cache tag return function will be described below.

When the cache determination result "miss_hit_flag" is invalid (deasserted), the input signal "rebirth" indicating return of cache data in the reorder buffer is confirmed. When the signal "rebirth" is valid (asserted), cache data stored in the reorder buffer is output to the I/F 516 as cache data "valid, cache_data" 585 (S690). Also, cache data in the storage area indicated by the write pointer and that stored in the reorder buffer are exchanged. Then, the write pointer is incremented by 1.

The aforementioned cache apparatus includes the function of temporarily storing cache tags and cache data scheduled to be discarded in the reorder buffer, and returning important cache data to the second pipeline according to their hit count values. For this reason, cache data which are repetitively used in image processing can be preferentially left, and those with low use frequencies can be preferentially discarded, thus improving the cache efficiency. Also, the exchange function is executed at the time of a cache miss and the return function is executed at the time of a hit, thus further improving the cache efficiency.

Another arrangement example of the cache determination unit 520 shown in FIG. 5 will be described below with reference to FIG. 10. The data processing apparatus 200 includes the hit count value calculation circuit. In the arrangement shown in FIG. 2, the use frequency is counted in one stage of the cache tag exchange circuit 250. In this case, when the number of data elements of the second pipeline of the data processing apparatus 200 increases, a delay of the decode circuit 302 of the hit count value calculation circuit 300 also increases. As a result, the operating frequency of the cache determination unit 520 is hardly improved. In the arrangement shown in FIG. 10, the second pipeline of the data processing apparatus 200 incorporates hit count value calculation circuits 730 and 750 (to be described later), and the need for the aforementioned hit count value calculation circuit 300 can be obviated. For this reason, even when the operating frequency is improved for hit count value calculations, it does not so seriously influence the operation.

Figure 10:
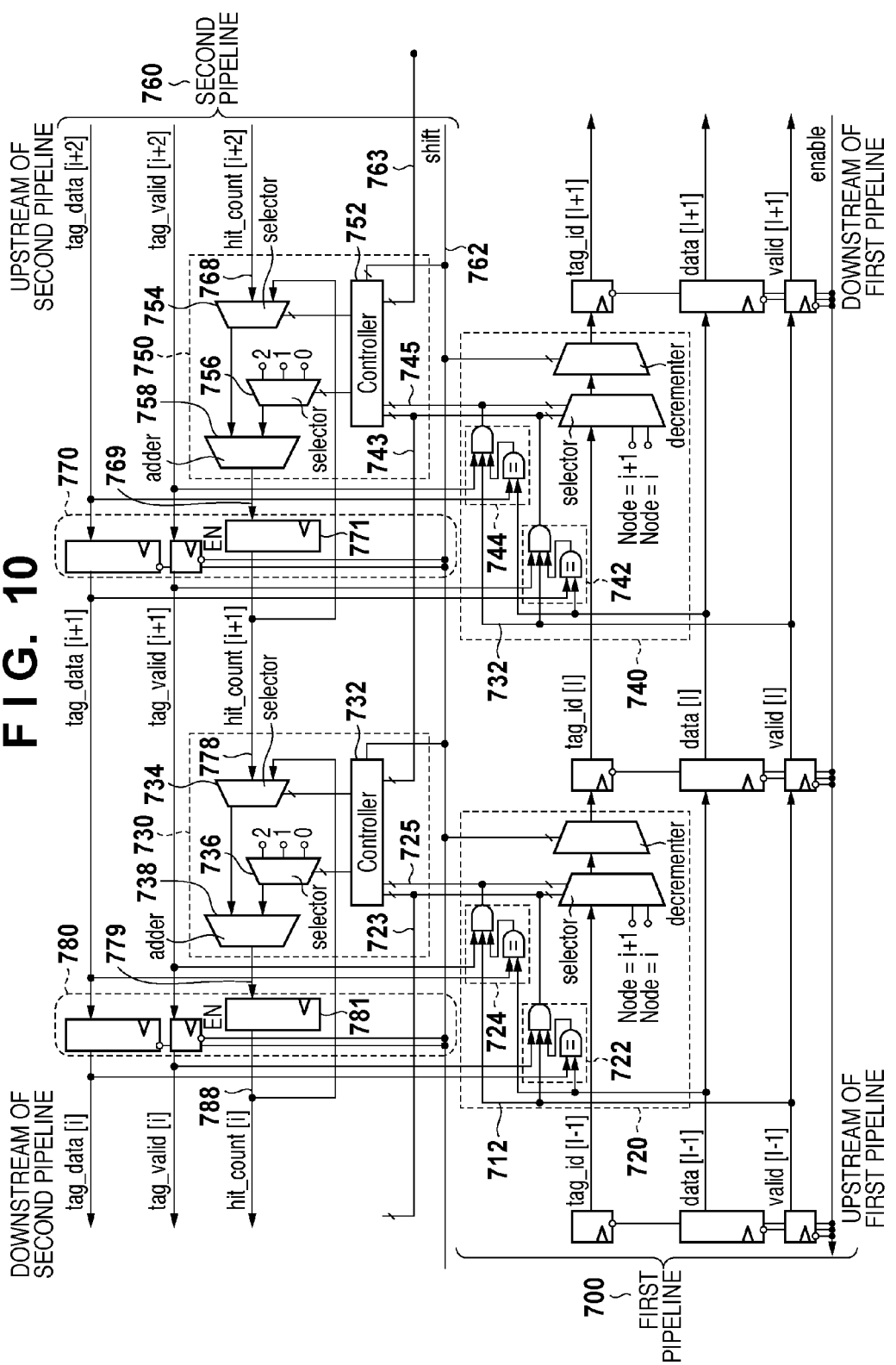
FIG. 10 is a block diagram showing an example of the basic arrangement of a data processing apparatus which incorporates attribute information.

Note that the basic arrangement shown in FIG. 10 corresponds to that shown in FIG. 1. Then, a use method of increasing the number of data elements of the data processing apparatus 200 by coupling a plurality of the basic arrangements, as shown in FIG. 2, is as described above, and a description thereof will not be repeated.

In FIG. 10, a first pipeline 700 shifts data from the left side as "upstream" on the plane of the drawing toward the right side as "downstream". Also, a second pipeline 760 shifts data from the right side on the plane of the drawing as "upstream" toward the left side as "downstream". Since various signal names and their meanings in FIG. 10 are the same as those described in FIG. 1, a description of the same signals will not be given. A mechanism for calculating hit count values and related units of the data processing circuit in FIG. 10 will be described below.

In the arrangement shown in FIG. 2, after completion of determination in the cache determination apparatus 280 located in the subsequent stage, a hit count value is calculated.

For this reason, the comparison circuits 122, 124, 142, and 144 in the data processing circuit shown in FIG. 1 need not consider the valid signals "valid[l−1]" 112 and "valid[l]" 132 of the first pipeline 100 upon execution of comparisons. In the arrangement shown in FIG. 10, since hit count values are calculated simultaneously with comparisons, comparison circuits 722, 724, 742, and 744 in FIG. 10 execute comparisons in consideration of valid signals "valid[l−1]" 712 and "valid [l]" 732 of the first pipeline 700. Then, the comparison circuits 722, 724, 742, and 744 calculate comparison results 723, 725, 743, and 745. To pipeline registers 780 and 770 of the second pipeline 760, registers 781 and 771 used to hold hit count values are added in addition to the arrangement shown in FIG. 1. These registers 781 and 771 correspond to the hit count value 304 of the hit count value calculation circuit 300 of the cache tag exchange circuit 250 shown in FIG. 3. The hit count values stored in these registers change independently of a drive signal "shift" 762 of the second pipeline. As a matter of course, unlike the valid signal "tag_valid" and data signal "tag_data", "holding" and "updating" are not switched by only the drive signal "shift" 762.

The second pipeline 760 includes the hit count value calculation circuits 730 and 750 used to calculate hit count values to be held in these registers. The hit count value calculation circuit 730 receives a hit count value "hit_count[i+1]" 778 from the pipeline register 770 of the second pipeline 760 and a hit count value "hit_count[i]" 788 from the pipeline register 780. Then, the hit count value calculation circuit 730 is controlled based on the comparison results 723, 725, and 743, and the externally input drive signal "shift" 762 to calculate a new hit count value 779. Then, the hit count value calculation circuit 730 writes the calculated new hit count value 779 in the register 781 of the pipeline register 780.

Likewise, the hit count value calculation circuit 750 receives a hit count value "hit_count[i+2]" 768 from a pipeline register (not shown) of the second pipeline 760. Furthermore, the hit count value calculation circuit 750 receives the hit count value "hit_count[i+1]" 778 from the pipeline register 770. Then, the hit count value calculation circuit 750 is controlled based on the comparison results 743 and 745 and the externally input drive signal "shift" 762 to calculate a hit count value 769, and to write it in the pipeline register 770.

Since the hit count value calculation circuits 730 and 750 perform the same operation, the following description will be given using the hit count value calculation circuit 730. The hit count value calculation circuit 730 performs different operations when the drive signal "shift" 762 is invalid (deasserted) and is valid (asserted). These operations will be described in turn below.

(When Drive Signal "Shift" 762 is Invalid (Deasserted))

When the drive signal "shift" 762 is invalid, data elements of the second pipeline 760 do not shift from "upstream" to "downstream". For this reason, a control circuit "Controller" 732 of the hit count value calculation circuit 730 operates a selector 734 to substitute the "hit_count[i]" 788 in an adder "adder" 738. Comparison targets at this time are a data signal "tag_data" in the pipeline register 780 of the second pipeline and a data signal "data[l−1]" of the first pipeline, and the comparison result 723 is selected as a comparison result of interest. Then, the "Controller" 732 operates the selector 736 based on this comparison result 723.

When the comparison result 723 is valid, the selector 736 selects a fixed value "1", and the "adder" 738 increments the "hit_count[i]" 788 by 1.

When the comparison result 723 is invalid, the selector 736 selects a fixed value "0", and the "hit_count[i]" 788 assumes a value which remains unchanged.

(When Drive Signal "Shift" 762 is Valid (Asserted))

When the drive signal "shift" 762 is valid, data elements of the second pipeline 760 shift from "upstream" to "downstream". For this reason, the "Controller" 732 operates the selector 734 to substitute the "hit_count[i+1]" 778 in the "adder" 738. Then, the "Controller" 732 operates the selector 736 based on the determination results 725 and 743.

When both the determination results 725 and 743 are valid, the data signal "tag_data" in the pipeline register 770 of the second pipeline 760 is equal to the two data signals "data[l−1]" and "data[l]" of the first pipeline. Hence, the selector 736 selects a fixed value "2", and the "adder" 738 increments the "hit_count[i+1]" 778 by 2.

When one of the determination results 725 and 743 is valid, the data signal "tag_data" in the pipeline register 770 of the second pipeline 760 is equal to one of the data signals "data[l−1]" and "data[l]" of the first pipeline. Hence, the selector 736 selects a fixed value "1", and the "adder" 738 increments the "hit_count[i+1]" 778 by 1.

When both the determination results 725 and 743 are invalid, the data signal "tag_data" in the pipeline register 770 of the second pipeline 760 is different from the two data signals "data[l−1]" and "data[l]" of the first pipeline. Hence, the selector 736 selects a fixed value "0", and the value of the "hit_count[i+1]" 778 remains unchanged. Then, the hit count value 779 obtained by the above sequence is written in the register 781 which stores a hit count value of the pipeline register of the second pipeline. With the above operations, the hit count value can be calculated in the basic arrangement.

In this case, the "Controller" 732 and a "Controller" 752 increment hit count values based on the comparison results 723, 725, 743, and 745. When this comparison result is different from a final comparison result, the hit count value is over-estimated.

That is, when the determination result of a data element ahead of a data element of interest is a cache miss, the data elements of the second pipeline shift downstream. Due to this shift, a data element which must exist when the data element of interest was compared in the respective data processing circuits is often discarded before the data element of interest is input to the determination apparatus. In this case, after the comparison result is valid, and a hit count value is incremented, the determination apparatus corrects the determination result to a cache miss. Hence, the hit count value assumes a value larger than a correct value.

However, since hit count values are evenly over-estimated for all cache data, cache data whose hit count values are under-estimated never appear. The purpose of the arrangement shown in FIG. 10 is to preferentially discard cache data having small hit count values from the cache apparatus, and to leave cache data having high use frequencies as much as possible. To attain this purpose, hit count values need only be relatively compared, and cache data having an extremely small hit count value need only be discarded. Hence, hit count values need not be strictly calculated.

If cache data is to be discarded from the cache apparatus due to an over-estimated hit count value, that cache data is re-used later, and a cache miss is determined. Then, the cache data is refilled again. That is, in such case, the cache efficiency lowers slightly, but the function itself of the image processing apparatus is not impaired.

That is, even when such restriction is included, it suffices to solve the problem of the present invention. Also, the arrangement shown in FIG. 10 has an effect of increasing the operating frequency of the circuit in place of this restriction, and the processing performance of the image processing apparatus itself can be improved since the operating frequency is increased. That is, the total processing performance of the image processing apparatus is very high.

Figure 11:
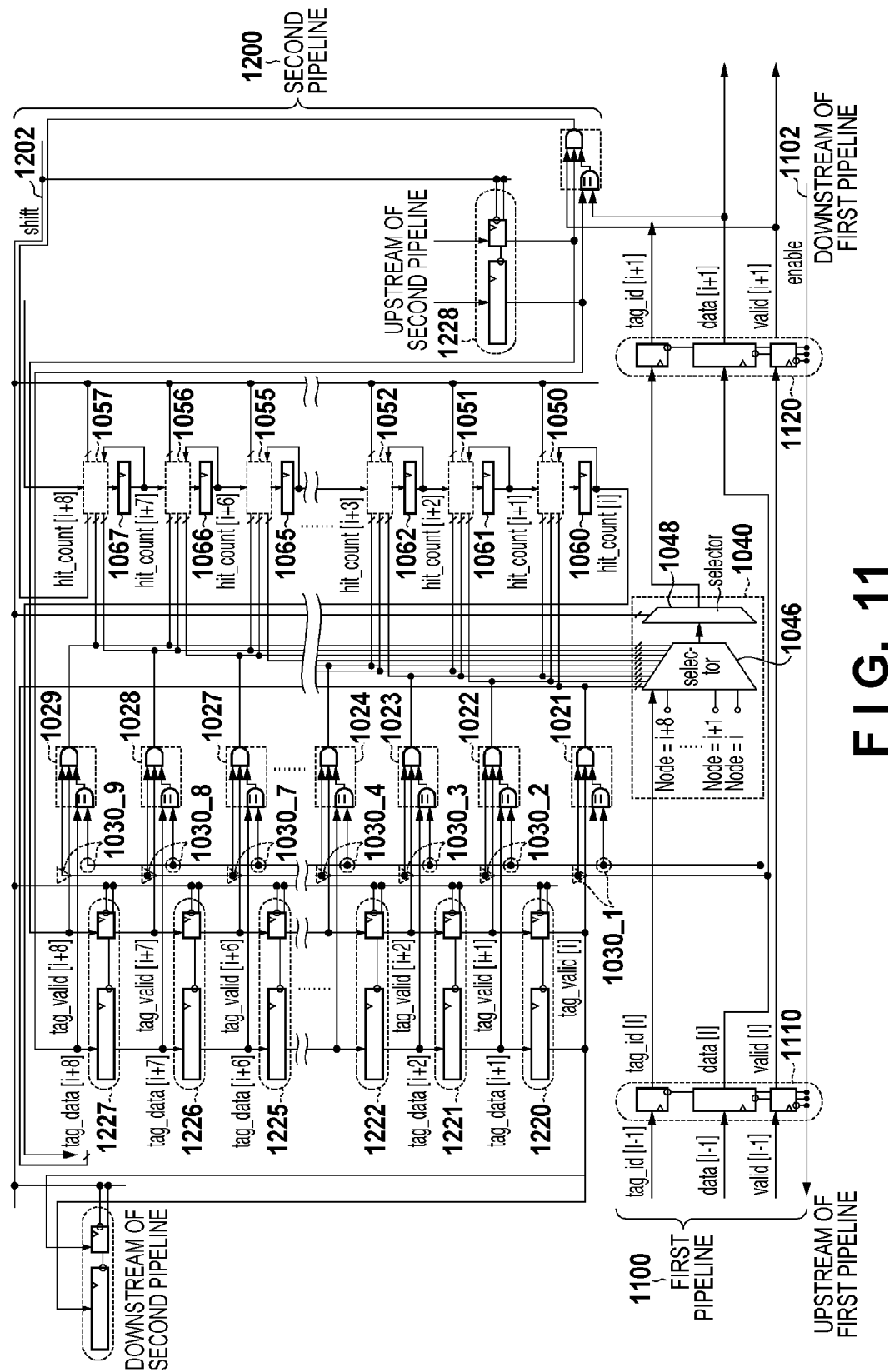
FIG. 11 is a block diagram showing an example of the basic arrangement of a data processing apparatus which incorporates attribute information.

Furthermore, the arrangement which relaxes the restriction of FIG. 10 will be described below with reference to FIG. 11. Referring to FIG. 11, a first pipeline 1100 shifts data from the left side as "upstream" on the plane of the drawing toward the right side on the plane of the drawing as "downstream". A second pipeline 1200 shifts data from the right side on the plane of the drawing as "upstream" toward the left side on the plane of the drawing as "downstream". Various signal names and their meanings in FIG. 11 are the same as those described using FIGS. 1 and 10, and a description of the same signals will not be repeated. Since the arrangement shown in FIG. 11 includes a different mechanism for counting a hit count value in the basic arrangement, related units of the data processing circuit will be described below.

The data processing circuit shown in FIG. 11 will be described below. Note that the data processing circuit shown in FIG. 10 and circuit elements included in that circuit are separated into comparison circuits 1021 to 1029 and a selection and subtraction circuit 1040 (including a selector 1046 and decrementer 1048) in FIG. 11.

In the arrangement shown in FIG. 11, one data signal "data" as a data element of one (first pipeline) of the two directions and a plurality of data signals "tag_data" 1220 to 1227 as data elements of the other (second pipeline) are simultaneously compared. If at least one signal "tag_data" which is equal to the signal "data" is found, a storage number of "tag_data" at that time is stored as "tag_id". If there are a plurality of signals "tag_data" which are equal to the signal "data", a method of "preferentially selecting a largest number" may be adopted.

More specifically, "valid[l]" and "data[l]" are copied to nodes 1030_1 to 1030_9, the number of which is larger by 1 than the number of signals "tag_data" to be compared simultaneously. In the example described in FIG. 7, since there are eight data elements "tag_data" to be compared, the number of nodes to be copied is nine. The reason why one extra node is copied is to prepare for a case in which data elements of the second pipeline shift, and comparison failures occur. Then, the nine comparison circuits 1021 to 1029 connected to the respective nodes are arranged, and are connected to the nodes 1030_1 to 1030_9. Furthermore, to the nine comparison circuits 1021 to 1029, a pair 1220 of "tag_valid[i]" and "tag_data[i]" to a pair 1227 of "tag_valid[i+8]" and "tag_data[i+8]" are respectively connected.

The operations of the comparison circuits 1021 to 1029 are the same as the arrangement shown in FIG. 10, and nine comparison results are input to the selector 1046. Then, the selector 1046 selects one of "Node=i" to "Node=i+8" as a storage number of the signal "tag_data" of an equal comparison result. When none of the nine comparison results are equal, the selector 1046 selects an input processing result signal "tag_id[l]".

As in the arrangement shown in FIG. 10, the storage number is selected by the method of "preferentially selecting a larger number". Then, when an external drive signal "shift" 1202 is valid, the selection result of the selector 1046 is adjusted by decrementing the storage number by 1 using the decrementer (subtractor) 1048.

The arrangement shown in FIG. 11 includes eight pipeline registers 1060 to 1067 so as to hold hit count values of data elements of the second pipeline 1200 in one interval of the first pipeline 1100. Also, the arrangement shown in FIG. 11 includes eight hit count value calculation circuits 1050 to 1057 used to calculate hit count values based on the above comparison results. The eight data elements 1220 to 1227, the eight pipeline registers 1060 to 1067 of hit count values, and the eight hit count value calculation circuits 1050 to 1057 of the second pipeline 1200 can be connected in the same manner as in the arrangement shown in FIG. 10.

By devising the connection method, as described above, a pipeline including eight intervals (eight stages) shown in FIG. 10 is realized by one interval (one stage), and a latency until completion of comparison for one input data can be reduced from 8 to 1. Then, such latency reduction can suppress the restriction which occurs in the arrangement shown in FIG. 3. By coupling a plurality of basic arrangements as one interval (one stage) of the first pipeline shown in FIG. 11, a very large number of data elements can be coped with.

Moreover, the arrangement in which the reorder buffer is expanded to a plurality of buffers will be described below with reference to FIG. 12. In the arrangement shown in FIG. 12, a plurality of cache tags are configured to be stored in the reorder buffer. In the arrangement shown in FIGS. 2 and 7, eight cache tags are stored in the data processing apparatus 200, and one cache tag is stored in the reorder buffer of the cache tag exchange circuit 250. That is, a full/set-associative cache tag determination unit of nine ways is substantially implemented.

When the reorder circuit 320 is expanded to M reorder buffers by expanding it to a plurality of cache tags, a full/set-associative cache tag determination unit of (8+M) ways is implemented. In the arrangement shown in FIG. 12, the number of ways of the full/set-associative system can be further increased, thus improving the cache efficiency.

Also, since the reorder circuit of the cache determination apparatus 280 is expanded without changing the already developed data processing apparatus 200, the number of ways of a cache can be expanded. With the arrangement shown in FIG. 12, in the full/set-associative cache apparatus, the data processing apparatus 200 and the reorder circuit of the cache determination apparatus 280 can divisionally implement the desired number of ways.

Figure 12:
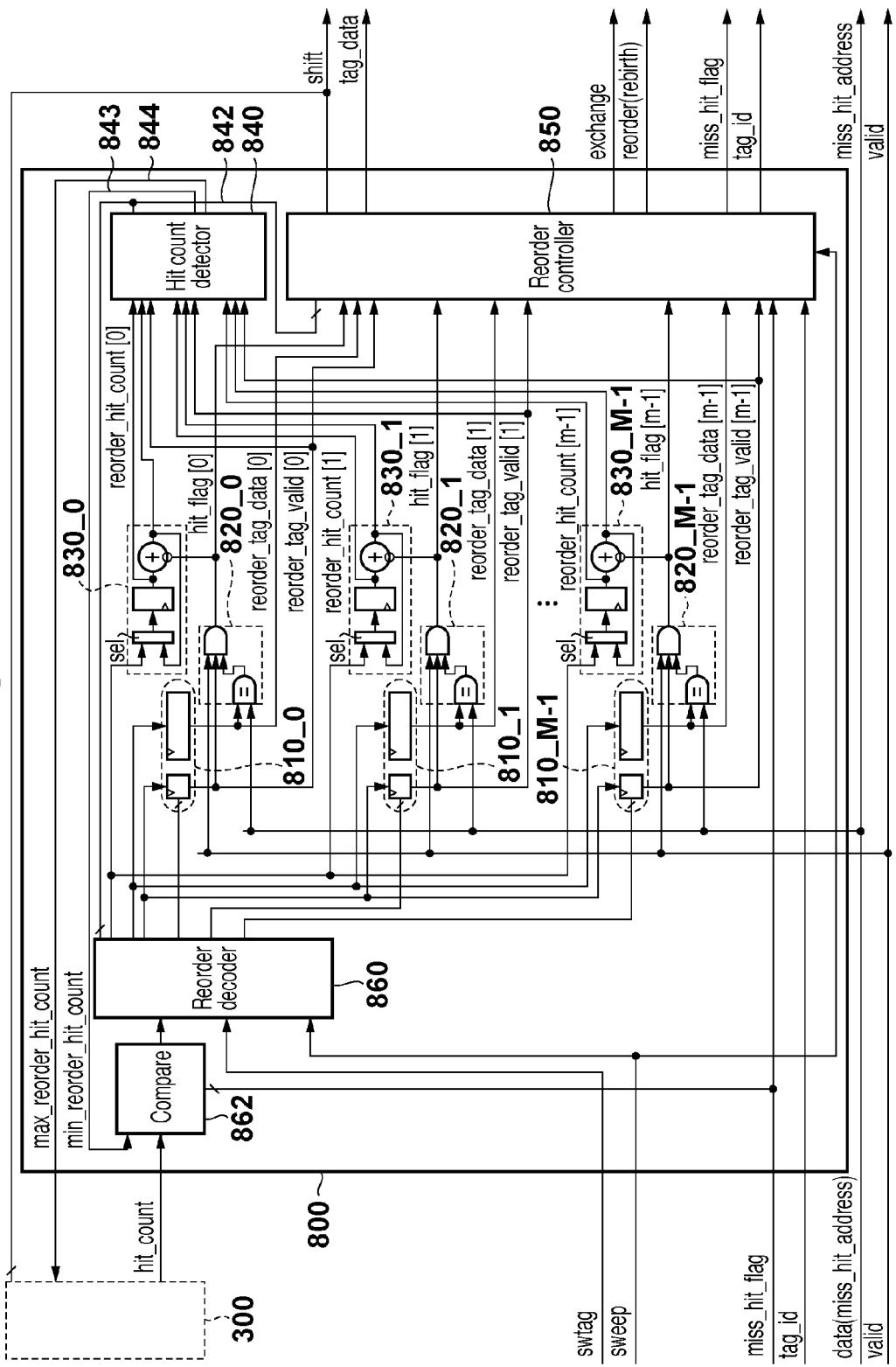
FIG. 12 is a block diagram showing an example of a reorder circuit which includes a plurality of reorder buffers in the data processing apparatus.
Figure 13A:
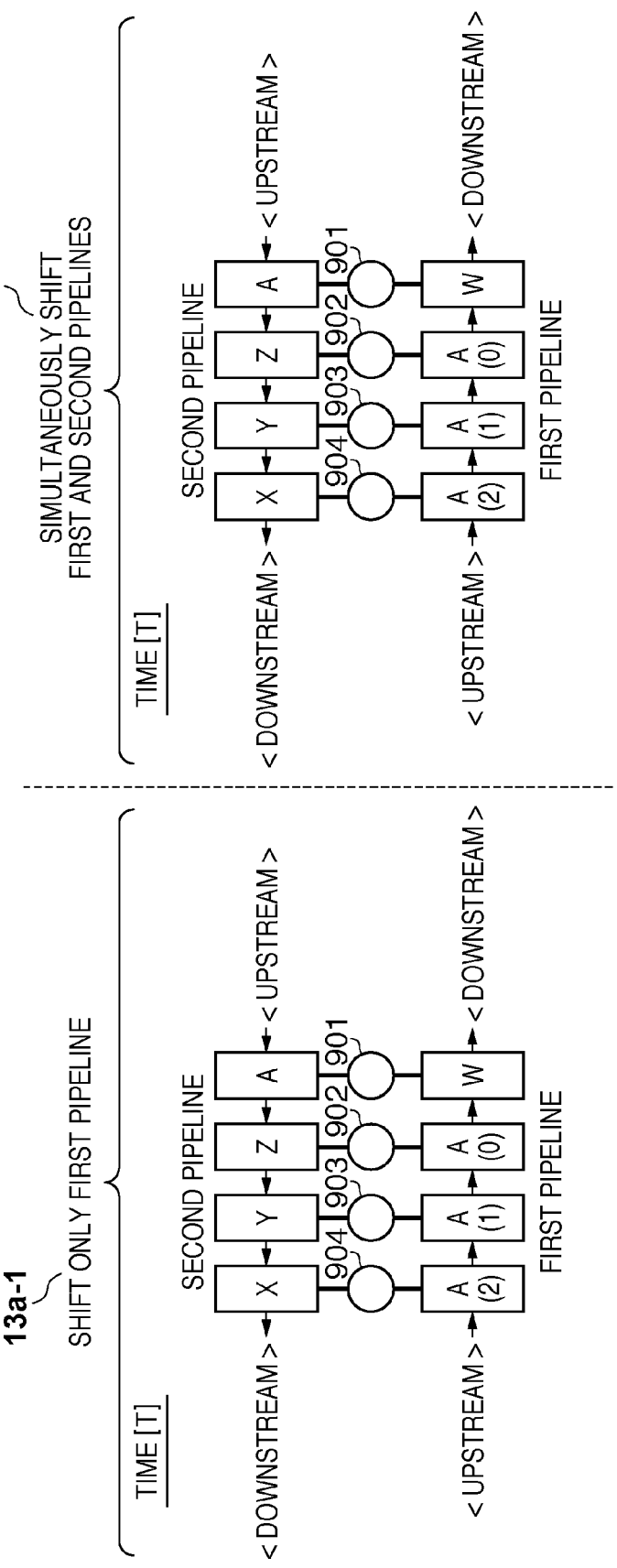

Note that various signal names and their meanings in FIG. 12 are the same as those in FIGS. 3 and 10, and a description of the same signals will not be repeated.

A block 300 shown in FIG. 12 corresponds to the hit count value calculation circuit 300 shown in FIGS. 3 and 10. A block 800 shown in FIG. 12 is a reorder circuit, and corresponds to the reorder circuit 320 shown in FIGS. 3 and 10. A control circuit "Reorder controller" 850 corresponds to the control circuit "Reorder controller" 350.

Unlike in the reorder circuit 320, the reorder circuit 800 includes the following M sets of circuits:

M reader buffers "reorder_tag_valid[0], reorder_tag_data[0] 810_0 to "reorder_tag_valid[m−1], reorder_tag_data[m−1] 810_M−1;

M comparison circuits 820_0 to 820_M−1; and

M hit counters "reorder_hit_count[0] and incrementer" 830_0 to "reorder_hit_count[m−1] and incrementer" 830_M−1.

Unlike in the reorder circuit 320, the reorder circuit 800 includes the following circuits which control the reorder circuit 800 based on the processing results of the M sets of circuits:

a "Hit count detector" 840 which detects an empty state of a buffer and a reorder buffer number of a minimum or maximum hit count value; and a "Reorder decoder" 860 which implements the exchange function.

The "exchange function of cache tag/cache data scheduled to be discarded" and "return function of cache tag/cache data scheduled to be discarded" will be described below with reference to FIG. 12. Both the functions are enabled when the input signal "miss_hit_flag" is valid (asserted).

(Exchange Function of Cache Tag/Cache Data Scheduled to be Discarded)

The M comparison circuits 820_0 to 820_M−1 compare an input signal "data(miss_hit_address)" with the M reorder buffers 810_0 to 810_M−1. If at least one equal reorder buffer is found, the "reorder_controller" 850 invalidates (deasserts) the signal "miss_hit_flag". Then, the "reorder_controller" 850 changes "tag_id" to the number of that reorder buffer.

Since the arrangement of FIGS. 2 and 7 includes only one reorder buffer, a storage position of cache data can be specified by validating (asserting) the signal "reorder" used to switch the reorder buffer and cache memory. However, in case of the arrangement shown in FIG. 12, the cache memory arbitration unit 580 has to be informed of storage positions of the plurality of reorder buffers.

When no equal reorder buffer is found, the following exchange function is enabled. A case will be examined now wherein one of reorder buffer valid signals "reorder_tag_valid[0]" 810_0 to "reorder_tag_valid[m−1]" 810_M−1 is invalid (deasserted). In this case, this indicates that one of the reorder buffers "reorder_tag_data[0]" 810_0 to "reorder_tag_data[m−1]" 810_M−1 is empty.

In reason, the reorder circuit 800 can unconditionally save a cache tag "swtag" scheduled to be discarded in one of the reorder buffers "reorder_tag_data[0]" 810_0 to "reorder_tag_data[m−1]" 810_M−1, which is empty. Hence, the "Hit count detector" 840 searches for an empty reorder buffer. More specifically, the "Hit count detector" 840 searches for one of the signals "reorder_tag_valid[0]" 810_0 to "reorder_tag_valid[m−1]" 810_M−1, which assumes an invalid (deasserted) value. Then, the "Hit count detector" 840 outputs a detection result 842.

Next, the "Reorder decoder" 860 receives this detection result 842, and saves the input signals "sweep, swtag" in one selected reorder buffer. Furthermore, the "Reorder decoder" 860 saves a hit count value "hit_count" scheduled to be discarded in one of the corresponding hit count values "reorder_hit_count[0]" 830_0 to "reorder_hit_count[m−1]" 830_M−1.

On the other hand, a case will be examined below wherein all of the reorder buffer valid signals "reorder_tag_valid[0]" 810_0 to "reorder_tag_valid[m−1]" 810_M−1 are valid (asserted). In this case, there is no empty reorder buffer. Hence, a reorder buffer to be exchanged has to be selected.

Hence, the "Hit count detector" 840 searches for a reorder buffer having a minimum hit count value of the hit count values "reorder_hit_count[0]" 830_0 to "reorder_hit_count [m−1]" 830_M−1. Then, the "Hit count detector" 840 outputs the detection result 842 and "min_reorder_hit_count" 843. A comparison circuit "Compare" 862 then compares a hit count value "hit_count" scheduled to be discarded with this "min_reorder_hit_count" 843.

When the hit count value "hit_count" scheduled to be discarded is larger, the "Reorder decoder" 860 overwrites the input signals "sweep, swtag, hit_count" on the reorder buffer selected based on the detection result 842. When the hit count value "hit_count" scheduled to be discarded is smaller, the "Reorder decoder" 860 discards the input signals "sweep, swtag, hit_count".

The cache memory arbitration unit 580 can include cache data storage areas corresponding to the M reorder buffers, and can update/exchange cache data in accordance with a signal "tag_id" indicating the number of the reorder buffer and signals "reorder" and "exchange".

With the aforementioned mechanism, the exchange function of cache tags/cache data scheduled to be discarded can be implemented for the plurality of reorder buffers.

(Return Function of Cache Tag/Cache Data Scheduled to be Discarded)

As in the exchange function, the M comparison circuits 820_0 to 820_M−1 compare an input signal "data(miss_hit_address)" with the M reorder buffers 810_0 to 810_M−1. If at least one equal reorder buffer is found, the "reorder_controller" 850 invalidates (deasserts) the signal "miss_hit_flag", and changes "tag_id" to the number of that reorder buffer.

On the other hand, the "Hit count detector" 840 searches for a reorder buffer having a maximum hit count value of the values "reorder_hit_count[0]" 830_0 to "reorder_hit_count [m−1]" 830_M−1. Then, the "Hit count detector" 840 outputs the detection result 842 and "max_reorder_hit_count" 844.

In this case, when the cache-hit reorder buffer is the same as the reorder buffer having the maximum hit count value, the return function is enabled. Based on the detection result 842, the "reorder_controller" 850 validates (asserts) the drive signal "shift", and writes "tag_data" in the second pipeline. At the same time, the "reorder_controller" 850 writes the "max_reorder_hit_count" 844 in the hit count value calculation circuit 300. The "Reorder decoder" 860 overwrites input signals "sweep, swtag, hit_count" on the reorder buffer selected based on the detection result 842.

The cache memory arbitration unit 580 can include cache data storage areas corresponding to the M reorder buffers, and can update/exchange cache data in accordance with a signal "tag_id" indicating the number of the reorder buffer and signals "rebirth" and "exchange".

With the aforementioned mechanism, the return function of cache tags/cache data scheduled to be discarded can be implemented for the plurality of reorder buffers.

In a recent cache apparatus, a cache memory can be partially designated as a non-cache area in which values are not rewritten. The case has been described as the problem wherein most of a sheet surface is often a white background, and high processing efficiency can be assured by assigning data for image processing required to print this white background to the non-cache area.

Hence, the second pipeline 760 of the data processing apparatus shown in FIG. 10 includes a flag which prevents a cache tag from being discarded (1-bit pipeline register) in place of the aforementioned hit counter and hit count value. Then, a function of identifying a part of the cache memory using the newly included discard prevention flag, and designating that part as the non-cache area is added. A storage destination in the cache memory indicated by a cache tag for which the discard prevention flag (register) of the second pipeline is valid (asserted) is the non-cache area.

The data processing apparatus stores required data (the aforementioned data of image processing required to print a white background) in a part of the cache memory in advance prior to the beginning of the image processing. Then, a storage destination (storage address) of the stored data on the cache memory is stored in a data element tag_data[i] of the second pipeline of the data processing apparatus, and a corresponding valid signal tag_valid[i] and discard prevention flag are set to be valid (asserted).

Next, the data processing apparatus starts the image processing, and executes desired processing. During the processing, when this cache tag whose discard prevention flag is valid (asserted) is discarded from the second pipeline, the data processing apparatus temporarily saves this cache tag in the reorder buffer, and surely returns the cache tag in the reorder buffer to the second pipeline of the data processing apparatus as in the aforementioned operations. With such operation, a cache memory can be partially designated as a non-cache area.

For example, a CPU may set, in advance, an address upper limit and lower limit which indicate a specific area on a memory in the data processing apparatus, and a memory within this range may be used as the non-cache area. In this case, the cache determination apparatus 280 may automatically validate (assert) the flag if a cache miss address is an address in the specific area.

Hence, a part of the cache memory can be used as the non-cache area (buffer) used to hold data required for the image processing (a buffer area having an arbitrary size can be assured in the cache memory). Then, the two different data holding modes, that is, the cache and non-cache area (buffer) are appropriately distributed according to the processing contents of the image processing, thus implementing a more efficient cache mechanism.

As described above, statistical information such as a hit count value and attribute information such as a flag designated from a processing apparatus (a CPU or processor) such as a computer are appended to a data element of the second pipeline. Then, data elements input to the second pipeline are controlled to be discarded or returned based on the priority order indicated by the appended attribute information. The priority order of data elements on the second pipeline can be appropriately changed via these mechanisms.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-173961 filed Aug. 2, 2010, which is hereby incorporated by reference herein in its entirety.

What is claimed is:

1. An information processing apparatus comprising:
   a first pipeline which has a plurality of first nodes, and shifts first data held in a first node of interest to a first node which is located in a first direction with respect to the first node of interest;
   a second pipeline which has a plurality of second nodes respectively corresponding to the first nodes of said first pipeline, and shifts second data held in a second node of interest to a second node which is located in a second direction opposite to the first direction with respect to the second node of interest;
   a processing unit configured to execute data processing using the first data and the second data; and
   a determination unit configured to hold second data output from the second pipeline, and decide priority order of the second data held by the determination unit based on attribute information of the second data held by the determination unit, the attribute information being used for determining whether the second data held by the determination unit is to be discarded or to be returned to the second pipeline, wherein the second data held by the determination unit and the second data held by the second pipeline are exchanged in accordance with the priority order.

2. The apparatus according to claim 1, wherein the second data held by said determination unit is input to said second pipeline based on the attribute information of the second data.

3. The apparatus according to claim 1, wherein said determination unit calculates the attribute information based on a result of the data processing of said processing unit.

4. The apparatus according to claim 1, wherein said second pipeline calculates the attribute information based on a result of the data processing of said processing unit.

5. The apparatus according to claim 1, wherein the data processing of said processing unit is processing for determining whether or not the first data of said first pipeline matches the second data of said second pipeline, and the attribute information is the number of matches.

6. The apparatus according to claim 1, wherein the attribute information is set from outside of said information processing apparatus.

7. The apparatus according to claim 1, wherein when said determination unit holds a plurality of second data, second data having minimum attribute information of the second data held by the determination unit is set to have a low priority order, and that second data is discarded to be exchanged with newly input second data.

8. The apparatus according to claim 1, wherein when said determination unit holds a plurality of second data, second data having maximum attribute information of the second data held by the determination unit is set to have a high priority order, and is input to said second pipeline.

9. The apparatus according to claim 1, wherein the attribute information includes information indicating a priority order.

10. A cache apparatus which manages whether or not to cache target data, comprising:
    an information processing apparatus of claim 1,
    wherein said first pipeline shifts addresses of the target data, and said second pipeline shifts cache tags, thereby determining a cache hit by checking whether or not the address and the cache tag match.

11. The apparatus according to claim 10, wherein the cache tags are divisionally held in said second pipeline and said determination unit.

12. A cache apparatus which manages whether or not to cache target data, comprising:
    an information processing apparatus of claim 1,
    wherein said first pipeline shifts addresses of the target data, and said second pipeline shifts cache tags, so that when the address and the cache tag do not match, said determination unit holds the output second data, and when the address and the cache tag match, said determination unit inputs the second data held by the determination unit to said second pipeline.

13. The apparatus according to claim 12, wherein said cache apparatus stores, in advance, required data in a part of said cache apparatus by identifying a storage address, and when the identified storage address of said first pipeline does not match the cache tag, said determination unit temporarily saves the second data from said second pipeline, and inputs the saved second data to the second pipeline.

14. A data processing method executed in a data processing apparatus, comprising:
- controlling a first pipeline, which has a plurality of first nodes, to shift first data held in a first node of interest to a first node which is located in a first direction with respect to the first node of interest;
- controlling a second pipeline, which has a plurality of second nodes respectively corresponding to the first nodes of the first pipeline, to shift second data held in a second node of interest to a second node which is located in a second direction opposite to the first direction with respect to the second node of interest;
- executing data processing using the first data and the second data; and
- holding second data output from the second pipeline, and deciding priority order of the second data held in the holding step based on attribute information of the second data held in the holding step, the attribute information being used for determining whether the second data held in the holding step is to be discarded or to be returned to the second pipeline, wherein the second data held in the holding step and the second data held by the second pipeline are exchanged in accordance with the priority order.

15. A program stored in a non-transitory computer-readable recording medium, said program controlling, when said program is executed by a processor, a computer to execute:
- controlling a first pipeline, which has a plurality of first nodes, to shift first data held in a first node of interest to a first node which is located in a first direction with respect to the first node of interest;
- controlling a second pipeline, which has a plurality of second nodes respectively corresponding to the first nodes of the first pipeline, to shift second data held in a second node of interest to a second node which is located in a second direction opposite to the first direction with respect to the second node of interest;
- executing data processing using the first data and the second data; and
- holding second data output from the second pipeline, and deciding priority order of the second data held in the holding step based on attribute information of the second data held in the holding step, the attribute information being used for determining whether the second data held in the holding step is to be discarded or to be returned to the second pipeline, wherein the second data held in the holding step and the second data held by the second pipeline are exchanged in accordance with the priority order.

* * * * *